US008332200B2

(12) United States Patent
Troedsson

(10) Patent No.: US 8,332,200 B2
(45) Date of Patent: Dec. 11, 2012

(54) METHOD AND SIMULATOR FOR GENERATING PHASE NOISE IN SYSTEM WITH PHASE-LOCKED LOOP

(75) Inventor: Niklas Troedsson, Los Gatos, CA (US)

(73) Assignee: United Microelectronics Corp., Science-Based Industrial Park, Hsinchu (TW)

( * ) Notice: Subject to any disclaimer, the term of this patent is extended or adjusted under 35 U.S.C. 154(b) by 966 days.

(21) Appl. No.: 12/371,828

(22) Filed: Feb. 16, 2009

(65) Prior Publication Data

US 2010/0211372 A1 Aug. 19, 2010

(51) Int. Cl.
*G06F 17/50* (2006.01)

(52) U.S. Cl. .............................................. 703/14; 703/2

(58) Field of Classification Search ................ 703/2, 13, 703/14; 702/72

See application file for complete search history.

(56) References Cited

U.S. PATENT DOCUMENTS

| | | | | |
|---|---|---|---|---|
| 6,657,500 | B1 | 12/2003 | Chen | |
| 6,778,025 | B1 * | 8/2004 | Leuthold | 331/16 |
| 2003/0177427 | A1 * | 9/2003 | Fattouh et al. | 714/741 |
| 2007/0100596 | A1 * | 5/2007 | Hollis | 703/14 |
| 2008/0068236 | A1 * | 3/2008 | Sheba et al. | 341/118 |

OTHER PUBLICATIONS

The Math Works, Using Simulink Version 3, 1998, Chapter 7, 16 pages.*

Authored by Ken Kundert, article titled “Modelling and Simulation of Jitter in Phase-Locked Loops”, adopted from Cadence Design Systems, San Jose, California, USA, 21 Pages, Nov. 1997.

Authored by Demir et al., article titled “Behavioral Simulation Techniques for Phase /Delay-Locked Systems”, adopted from Custom Integrated Circuits Conference, 1994., Proceedings of the IEEE1994, pp. 453-456, May 1994.

Authored by Ken Kundert, article titled Modelling Jitter in PLL-based Frequency Synthesizer, downloaded from http:/www.designer-guide.org, version 4g, Aug. 2006, 32 Pages.

Authored by Ken Kundert, article titled Predicting the Phase Noise and Jitter of PLL-based Frequency Synthesizer, downloaded from http:/www.designer-guide.org, version 4g, Aug. 2006, 51 pages.

Jon Yearsley, Generate spatial data, http://www.mathworks.com/matlabcentral/fileexchange/5091-generate-spatial-data, Jun. 3, 2004, p. 1-3.

* cited by examiner

*Primary Examiner* — Saif A Alhija
*Assistant Examiner* — Luke Osborne
(74) *Attorney, Agent, or Firm* — Winston Hsu; Scott Margo

(57) ABSTRACT

A method and simulator for generating phase noise in a system with a phase-locked loop (PLL) are disclosed. Each simulation block of the system with the PLL has its own predefined phase noise vector whose elements are injected consecutively at a trigger event. An element selection of the predefined noise vector of is steered from the master element block, which is usually the voltage or current-controlled oscillator. Some simulation blocks, called semi-master element blocks, are self-triggered and determines their own injection frequency rates, and are reset-steered and aligned with the master element block as a capturing data phase starts; while other simulation blocks, called slave element blocks, are directly steered with the master element block.

16 Claims, 21 Drawing Sheets

81

Code_110

```
% initiate vector cornerstones
fstop = F_BW/ 2
nstop = N_FFT/2
ncorner = round (F_c/fstop·nstop);
```

Code_111

```
% normalized fq vectors
fq1 = (0:(ncorner−1))/nstop/2;
fq2 = ((ncorner+0):nstop)/nstop/2;
fq3 = −1/2+(1:(nstop−ncorner))/nstop/2;
fq4 = −1/2+((nstop−ncorner+1):nstop−1)/nstop/2;
```

Code_112

```
% normalized hq vectors to fc level
hq1 =fq1.^s_1·10^(s_1·log10(F_BW/F_c));
hq2 =fq2.^s_2·10^(s_2·log10(F_BW/F_c));
hq3 =fq3.^s_2·10^(s_2·log10(F_BW/F_c));
hq4 =fq4.^s_1·10^(s_1·log10(F_BW/F_c));
% spectrum with slopes denomalized to F_m level
if F_m < F_c
      hq = [hq1 hq2 hq3 hq4]·10^(−1+P_n/10−s_1·log10(F_m/F_c))/2;
else
      hq = [hq1 hq2 hq3 hq4]·10^(−1+P_n/10−s_2·log10(F_m/F_c))/2;
end
hq(hq==inf) = 0;
```

Code_113

```
% calculating noise spectra via inverse-FFT (IFFT 1-dim)
phi= rand([1, N_FFT]);
noi = ifft(hq.^0.5.*(cos(2 π·F_BW·phi )+i· sin(2 π·F_BW·phi )), N_FFT)· N_FFT · π;
```

Code_114

```
% saving the real
x=real(noi)
```

FIG. 13B

Code_120

```
% initiate vector cornerstones
fstop = F_BW/2;
fstart = F_BW/N_FFT;
```

Code_121

```
% read-in simulation noise vector "filen"
tmp = importdata(filen);
col1 = tmp.data(:,1);
col2 = tmp.data(:,2);
% convert vector to linear to log representatio
% linear interpolation new y = interp1(old x,old y,new x);
cxlin = linspace(fstart,fstop,nfft/2);
cxlog = logspace(log10(fstart),log10(fstop),nfft/2);
col1m = interp1(col1, col1, cxlog, 'linear', 'extrap');
col2m = interp1(col1, col2, cxlog, 'linear', 'extrap');
col1l = interp1(col1, col1, cxlin, 'linear', 'extrap');
col2l = interp1(col1m,col2m,col1l, 'linear', 'extrap');
```

Code_122

```
% hq spectrum vectors
hq = 10.^([col2l fliplr(col2l)]/10) /log10(bw)/4;
hq(hq==inf) = 0;
hq(end) = hq(end-1);
hq(1) = hq(2);
```

Code_123

```
% calculating noise spectra via inverse-FFT (IFFT 1-dim)
phi= rand([1, N_FFT]);
noi = ifft(hq.^0.5.*(cos(2 π·F_BW·phi )+i· sin(2 π·F_BW·phi )), N_FFT)· N_FFT · π;
```

Code_124

```
% saving the real
x=real(noi)
```

FIG. 15B

METHOD AND SIMULATOR FOR GENERATING PHASE NOISE IN SYSTEM WITH PHASE-LOCKED LOOP

BACKGROUND OF THE INVENTION

1. Field of Invention

The present invention generally relates to a method and simulator for generating phase noise, and more particularly to a method and simulator for generating phase noise in a system with a phase-locked loop when the system is simulated in time domain.

2. Description of Prior Art

Phase-locked loops (PLLs) are vital organs to many common electronic devices in a broad field of applications from wireless telecommunication to computer systems. As an example, in a modern mobile phone alone and the other applications they are prerequisite in the radio unit to transmit and receive signals. Therefore, in the digital signaling processor (DSP) computer, memory, screen and camera, the data is transmitted and processed therein and thus the phone's functionality is established.

A PLL is a regulating control system that forces the output signal of a controlled oscillator to track and be in phase with a reference input signal. A PLL is commonly used as a frequency synthesizer to generate a variable higher frequency from a lower reference frequency, where the lower reference frequency is more stable and accurate, which properties the higher frequency inherits. The controlled oscillator is the engine of the PLL. Oscillators are autonomous circuits that generate an oscillating signal.

There are many oscillator types but they all condense into one of two canonical forms, namely relaxation and harmonic oscillators. The oscillator usually consists of an amplifier in positive feedback configuration and a resonator. The amplifier provides gain to sustain oscillation by counteracting mechanical or electrical losses of the whole system. The resonator may be in form of a quarts crystal, bulk acoustic wave (BAW), micro-electro-mechanical systems (MEMS) or LC-tank circuit, which will mainly determine the operating frequency, however, likely in conjunction with other capacitors, inductors and resistors.

FIG. 1 is a block diagram of a frequency synthesizer 10. The frequency synthesizer 10 includes a PLL 11, a crystal oscillator 12, two frequency dividers 13 and 14. The crystal oscillator 12 is coupled to the frequency divider 13, the frequency divider 13 is coupled to the PLL 11, and the PLL 11 is coupled to the frequency divider 14. The PLL 11 includes a phase-frequency detection circuit 110, a charge pump circuit 111, a low pass filter 112, and a voltage-controlled oscillator 113. The phase-frequency detection circuit 110 and the charge pump circuit 111 are integrated in one block, and this block is usually called a PFD/CP block 114.

To meet the stringent requirement of many different kinds of communication systems, the frequency of a first reference signal provided by the crystal oscillator 12, is usually a very stable frequency source in its operating environment and be robust to variations in temperature, surrounding electronic components, signals and possess the quality of aging slowly. The frequency of the first reference signal often relies on its stability and quality on a quarts crystal, BAW or MEMS resonator.

The frequency divider 13 is a pre-frequency divider used to divide the frequency of the reference signal by R, so as to obtain a second reference signal. It is noted that the frequency divider 13 is not a necessary component, and can be removed in the frequency synthesizer 10. However, in order to increase the resolution of the frequency synthesizer 10, the frequency divider 13 is usually required.

The PLL 11 receives the second reference signal and the output signal of the frequency divider 14. The output signal PLL_OUT of the PLL 11 is adjusted in response to the second reference signal and a feedback signal provided by the frequency divider 14, and thus the output signal PLL_OUT of the PLL 11 inherits the phase of the second reference signal provided by the frequency divider 13. The frequency divider 14 divides the frequency of the output signal PLL OUT by N, so as to output the feedback signal.

While the frequencies, or the phases, of the feedback signal and the second reference signal are not the same, the PLL 11 adjusts the output signal PLL_OUT, and thus the frequency and phase of the feedback signal provided by frequency divider 14 are indirectly adjusted to be same as those of the second reference signal. It is noted that the dividing rates R and N may be different from each other, or equal to each other. Generally, the dividing rate N is larger than the dividing rate R, so that the frequency of the output signal PLL_OUT is higher than the frequency of the first reference signal.

The phase-frequency detector circuit 110 receives the second reference signal and the feedback signal. The phase-frequency detector circuit 110 compares both the frequencies and phases of the second reference signal and the feedback signal, and generates at least one corresponding output pulse. The charge pump circuit 111 adjusts and outputs at least one current signal in response to the output pulse output from the phase-frequency detector circuit 110. The current signal output from the charge pump circuit 111 reflects the phase and frequency deviations between the second reference signal and the feedback signal. The current signal output from the charge pump circuit 111 is then filtered by the low pass filter 112, and the low pass filter 112 outputs a filtered result having a low frequency, near DC. The voltage-controlled oscillator 113 adjusts the frequency of the output signal PLL_OUT in response to the voltage of the filtered result.

In order to simulate circuit designs on transistor level, circuit designers relies on electronic design automation (EDA) tools from, for instance, Mentor Graphics®, Cadence Design Systems Inc., or Agilent Technologies Advanced Design System (ADS). To find the phase noise, jitter or spur of a complete PLL, a transient or periodic steady state analysis must be performed, but this is time consuming and is not feasible with today's simulation tools. The main reasons are due to the complex and non-linear behavior of the entire circuit, which consists of a large number of transistors, a long transient simulation is required to capture the start-up and locking before collecting and processing data of interest, and lastly because the ratio between lowest and highest frequency, set by the integer or fractional divider ratio, imposes a numerical issue to the numerical solvers.

Mixed-signal and multi-level simulation languages alleviates the difficult nature of transient simulations of PLLs, they speed up the simulation time significantly and accurately describe the analog and digital portion of the transistor circuits represented by much simpler equivalent behavior models. One such popular behavioral language is Verilog-AMS, which is an analog and mixed signal (AMS) derivative of the Verilog hardware description language (HDL), IEEE 1364-1995 Verilog-HDL. Other simulation tools that can be used to simulate the dynamics of PLL systems and characteristics is MATLAB® and Simulink® from The MathWorks, or the PLL Noise Analyzer™ from Berkeley Design Automation Inc, to mention a few.

The PLL jitter and phase noise generation methodology has been proposed in the following references: (Ref 1) Ken Kundert, Modelling and simulation of jitter in phase-locked loops, in *Analog Circuit Design: RF Analog-to-Digital Converters, Sensor and Actuator Interfaces, Low-Noise Oscillators, PLLs and Synthesizers*, Kluwer Academic Publishers, November 1997; (Ref 2) A. Demir, E. Liu, A. L. Sangiovanni-Vincentelli, and I. Vassiliou, Behavioral simulation techniques for phase/delay-locked systems, in *Custom Integrated Circuits Conference,* 1994, Proceedings of the IEEE 1994, pages 453-456, May 1994; (Ref. 3) Ken Kundert, Modelling jitter in PLL-based frequency synthesizer, as shown in the website http://www.designer-guide.org, 2003; (Ref. 4) Predicting the phase noise and jitter of PLL-based frequency synthesizer, in *Phase-Locking in High Performances*, IEEE press, 2003, Behzad Razavi (editor), written in August 2002 and last updated on Aug. 30, 2006; (Ref. 5) Oskar Leuthold, System and method for simulating the noise characteristics of phase looked loops in transient analysis, U.S. Pat. No. 6,778, 025.

A fast and accurate PLL jitter and phase noise methodology using Verilog for analog signals (Verilog-A) is presented in Ref. 1, which was evolved from ideas provided in Ref. 2. For each block of the PLL, transistor level simulations are performed to characterize the noise behavior. Thereafter, a single jitter value is extracted, related to white noise, and applied to each module of the entire PLL. In the Verilog-A VCO module provided in Refs. 3 and 4, each period time is extracted and saved into a file, which can be post-processed to calculate phase noise, jitter and spur corresponding to the PLL output. The principles of Refs. 1-4 involve extracting and generating the VCO phase noise data from a transient simulation and then converting the PLL blocks into behavioral-level models to simulate a PLL transient analysis, and some of these ideas later are showed up in Ref. 5.

The output from the digital VCO behavioral model provided in Ref. 5 is stored in a file and is post-processed to create noise spectrum data, as presented in Refs. 3 and 4. In Refs. 1, 3, and 4, the PLL jitter is classified as either synchronous or accumulating jitter. Synchronous jitter appears in driven circuits, like the PFD/CP block and frequency divider. It is observed as a time delay variation from an input event to an output occurrence. Accumulating jitter appears in autonomous circuits such as oscillators (including a voltage-controlled oscillator and a current-controlled oscillator), where the next output transition depends on the previous output event.

For fixed frequency oscillators the jitter can easily be modeled as a time variation of the period, and for current or voltage-controlled oscillators the jitter can be modeled as a modulated (dithered) frequency. The relation of the output and input signals of the controlled oscillator may be expressed as the following equation:

$$V_{out} = \sin\left(mnondulo\left(\int \frac{V_{in}K_{VCO} + f_c}{1 + J\delta(V_{in}K_{VCO} + f_c)}\right)\right).$$

The total frequency of the controlled oscillator is found by multiplying the input signal $V_{in}$ by the frequency sensitivity $K_{vco}$ before adding the center frequency of the oscillator $f_c$. The frequency is then modulated by jitter, Jδ, before integrating and applying modulo to the phase argument. J represents the jitter value, and δ is a zero-mean unit-variance Gaussian random process. The modulated frequency is integrated and modulo 2π is applied to the phase argument, after which a trigonometry sinusoid function or square wave function is used to generate the output signal of the controlled oscillator.

FIG. 2 is a block diagram of a conventional apparatus 20 for simulating the system with the PLL when the phase noise is applied thereon. The conventional apparatus 20 is provided in Refs. 1, 3, and 4. The conventional apparatus 20 includes a behavior function module 201, a trigger signal generating circuit 202, a Gaussian random number generator 203, and a multiplier 204. The behavior function module 201 is coupled to the trigger signal generating circuit 202 and the multiplier 204, and the Gaussian random number generator 203 is coupled between the trigger signal generating circuit 202 and the multiplier 204.

The behavior function module 201 receives input signals and then internally generates a module signal to the trigger signal generating circuit 202. The trigger signal generating circuit 202 updates the state of the Gaussian random number generator 203 in response to the module signal. The Gaussian random number generator 203 is a zero-mean unit-variance Gaussian random number (δ) generator. The Gaussian random number δ is multiplied with the extracted jitter value J from simulations or hand-calculations, resulting in the jitter (or white noise) sequence δJ, which is injected back into the module function behavior function module 201.

FIG. 3 is a block diagram of another conventional apparatus 30 for simulating the system with the PLL when the phase noise is applied thereon. The conventional apparatus 30 includes a behavior function module 301, a trigger signal generating circuit 302, a Gaussian random number generator 303, a multiplier 304, a storage circuit 306, and a measure circuit 305. The behavior function module 301 is coupled to the trigger signal generating circuit 302, the multiplier 304, and the measure circuit 305, and the Gaussian random number generator 303 is coupled to the trigger signal generating circuit 302, the storage circuit 306, the measure circuit 305, and the multiplier 304.

The behavior function module 301, the trigger signal generating circuit 302, the Gaussian random number generator 303, and a multiplier 304 of the conventional apparatus 30 are respectively same as those of the conventional apparatus 20, and thus are not described again herein. The measure circuit 305 measures the output signal of the behavior function module 301 and the trigger signal output from the trigger signal generating circuit 302. The storage circuit 306 stores the output signal of the behavior function module 301, the trigger signal output from the trigger signal generating circuit 302, and the measure time, so as to record the noise spectrum data. Both conventional apparatuses 20 and 30 generate the phase noise and jitter for their behavior functions of their whole circuit, and this is time consuming, due to the high complexity. Therefore, it is not convenient for chip designer to obtain the performance of the circuit by the simulation with phase noise and jitter.

In Ref. 5, a method for generating a spatial noise pattern in two dimensions with a scale-invariant power spectrum with a normal error distribution is provided. Referring to FIG. 4, FIG. 4 is a flow chart of the conventional method for generating a spatial noise pattern (in time domain), which is disclosed in Ref. 5. In step S40, a set of two-dimensional frequency grids is generated, that is, a normalized frequency grid is created for each dimension. In step S41, a power spectrum is generated based on the set of the two-dimensional frequency grids. It is noted that the power spectrum in step S41 is generated for a single slope.

In step S42, a set of two-dimensional random phase shift grids is generated, and then in step S43, the set of two-dimensional random phase shift grids (complex numbers) is multiplied by the square root of the power spectrum. In step S44, an inverse fast Fourier transformation (IFFT) is performed on the multiplying result in step S43, so as to obtain a spatial noise pattern. Then in step S45, the real part of the spatial noise pattern is saved into a storage circuit. The real part of the spatial noise pattern is used to be applied on the behavior function module of the circuit, and thus the simulation with the phase noise and jitter can be carried out. However, this conventional method is used for a single slope, and in some conditions, the slope of the curve of the noise spectrum is a combination of multiple slopes.

SUMMARY OF THE INVENTION

Accordingly, the present invention is directed to a method and simulator for generating phase noise in a system with a phase-locked loop.

The present invention provides a method for generating phase noise in a system with a phase-locked loop while the system is simulated in time domain. The method comprises the following steps: (a) modelling a simulator, wherein the simulator comprises simulation blocks, the simulation blocks corresponds to blocks of the system, each of the simulation blocks has a predefined phase vector whose elements are injected consecutively at a trigger event; (b) classifying the simulation blocks, wherein each of the simulation block is classified as a master element block, a semi-master element block, or a slave element block. Wherein, an element selection of each predefined noise vector is steered from the master element block. The semi-master element block is self-triggered and determines its own injection frequency rate, and is reset-steered and aligned with the master element block as it start its capturing data phase. The slave element block is directly steered with the master element block.

According to the embodiment of the present invention, the blocks of the system with the PLL comprise the PLL, a frequency divider, and a crystal oscillator. Wherein, the PLL comprises a PFD/CP block, and a low pass filter, and a controlled oscillator. The simulation block corresponding to the controlled oscillator is the master element block, the simulation blocks corresponding to the crystal oscillator, the frequency divider, and the PFD/CP block are the semi-master element blocks, and the simulation block corresponding to the low pass filter is the slave element block.

According to the embodiment of the present invention, each predefined noise vector is generated theoretically or by a transistor level circuit simulation, and the type of each predefined noise vector is classified as an accumulation noise, a synchronous noise, and a general type noise.

According to the embodiment of the present invention, the steps for generating each predefined noise vector theoretically comprises the following steps: (a) initiating and finding a corner element based on a PLL output frequency and a FFT point size; (b) generating normalized frequency grid vectors based on the corner element, wherein each two frequency grid vectors correspond to one of slopes of noise; (c) generating a power spectrum of the noise based on the normalized frequency grid vectors; (d) generating a set of one-dimensional random phase shift grids, and multiplying the set of the random phase shift grids by the power spectrum of the noise; (e) performing the IFFT on a multiply result to obtain a time domain noise vector, and saving the real part of the time domain noise vector; (f) post-processing the time domain noise vector to generate the predefined noise vector.

According to the embodiment of the present invention, the steps for generating each predefined noise vector by the transistor level circuit simulation comprises the following steps: (a) initiating and finding a corner element based on a PLL output frequency and a FFT point size; (b) reading a noise file, extracting and interpolating read-in frequencies to generate new frequencies and a new noise frequency range; (c) generating a power spectrum of the noise based on the new frequencies; (d) generating a set of one-dimensional random phase shift grids, and multiplying the set of the random phase shift grids by the power spectrum of the noise; (e) performing the IFFT on a multiply result to obtain a time domain noise vector, and saving the real part of the time domain noise vector; (f) post-processing the time domain noise vector to generate the predefined noise vector.

The present invention provides a simulator for generating phase noise in a system with a phase-locked loop while system is simulated in time domain. The simulator comprises a master element block, at least one slave element block, and semi-master element blocks. Each of them has its own predefined noise vectors whose elements are injected consecutively at a trigger event. Wherein, an element selection of each predefined noise vector is steered from the master element block. The semi-master element blocks are self-triggered and determines their own injection frequency rate, and are reset-steered and aligned with the master element block as a capturing data phase starts. The slave element block is directly steered with the master element block.

According to the embodiment of the present invention, the master element block comprises a behavior function module, a trigger signal generating circuit, a counter, and a predefined noise vector generator. A behavior function of the he behavior function module corresponds to a block in the system. The behavior function module receives an input signal and an element selected from the predefined noise vector thereof, and outputs a module signal in response to the input signal, and an output signal in response to the behavior function thereof, the element selected from the predefined noise vector thereof, and the input signal. The trigger signal generating circuit is adapted for receiving the module signal and outputting a trigger signal. The counter counts an element select signal from an initial value, and increases the element select signal by one when the trigger signal triggers it, wherein a reset terminal of the counter is floated. The predefined noise vector generator is adapted for generating the predefined noise vector thereof, and outputting the element selected from the predefined noise vector thereof according to the element select signal, wherein the element select signal is used to steer the element selection of the other predefined noise vectors.

According to the embodiment of the present invention, the master element block further comprises a stop circuit, a writing control circuit, a measure circuit, and a storage circuit. The stop circuit stops the behavior function module when the element select signal is equal to a number of $2^x$, wherein x is an integer. The writing control circuit controls the measure circuit and the storage circuit according to the element select signal. The measure circuit measures a time period of the output signal generated in the capturing data phase. The storage circuit writes the time period and the output signal in the capturing data phase.

According to the embodiment of the present invention, the initial value is a negative integer which is less enough for the master element block to discard the output signal before the master element block enters the capturing data phase.

According to the embodiment of the present invention, each of the semi-master element blocks comprises a behavior function module, a trigger signal generating circuit, a counter, and a predefined noise vector generator. A behavior function of the behavior function module corresponds to a block in the system. The behavior function module receives an input signal and an element selected from the predefined noise vector thereof, and outputs a module signal in response to the input signal, and an output signal in response to the behavior function thereof, the element selected from the predefined noise vector thereof, and the input signal. The trigger signal generating circuit receives the module signal and outputs a trigger signal. The counter counts an element select signal from an initial value, and increases the element select signal by one when the trigger signal triggers it, wherein the counter is reset-steered and aligned with the master element block as the capturing data phase starts. The predefined noise vector generator generates the predefined noise vector thereof, and outputs the element selected from the predefined noise vector thereof according to the element select signal.

According to the embodiment of the present invention, the slave element block comprises a behavior function module and a predefined noise vector generator. A behavior function of the behavior function module corresponds to a block in the system. The behavior function module receives an input signal and an element selected from the predefined noise vector thereof, and outputs a module signal in response to the input signal, and an output signal in response to the behavior function thereof, the element selected from the predefined noise vector thereof, and the input signal. The predefined noise vector generator generates the predefined noise vector thereof, and outputs the element selected from the predefined noise vector, wherein the element selection of the predefined noise vector is steered and aligned with the master element block as the capturing data phase starts.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 13B is a code table of the code executed in MATLAB® for implementing step S901.

FIG. 15B is a code table of the code executed in MATLAB® for implementing step S904.

DESCRIPTION OF THE EMBODIMENTS

Figure 1:
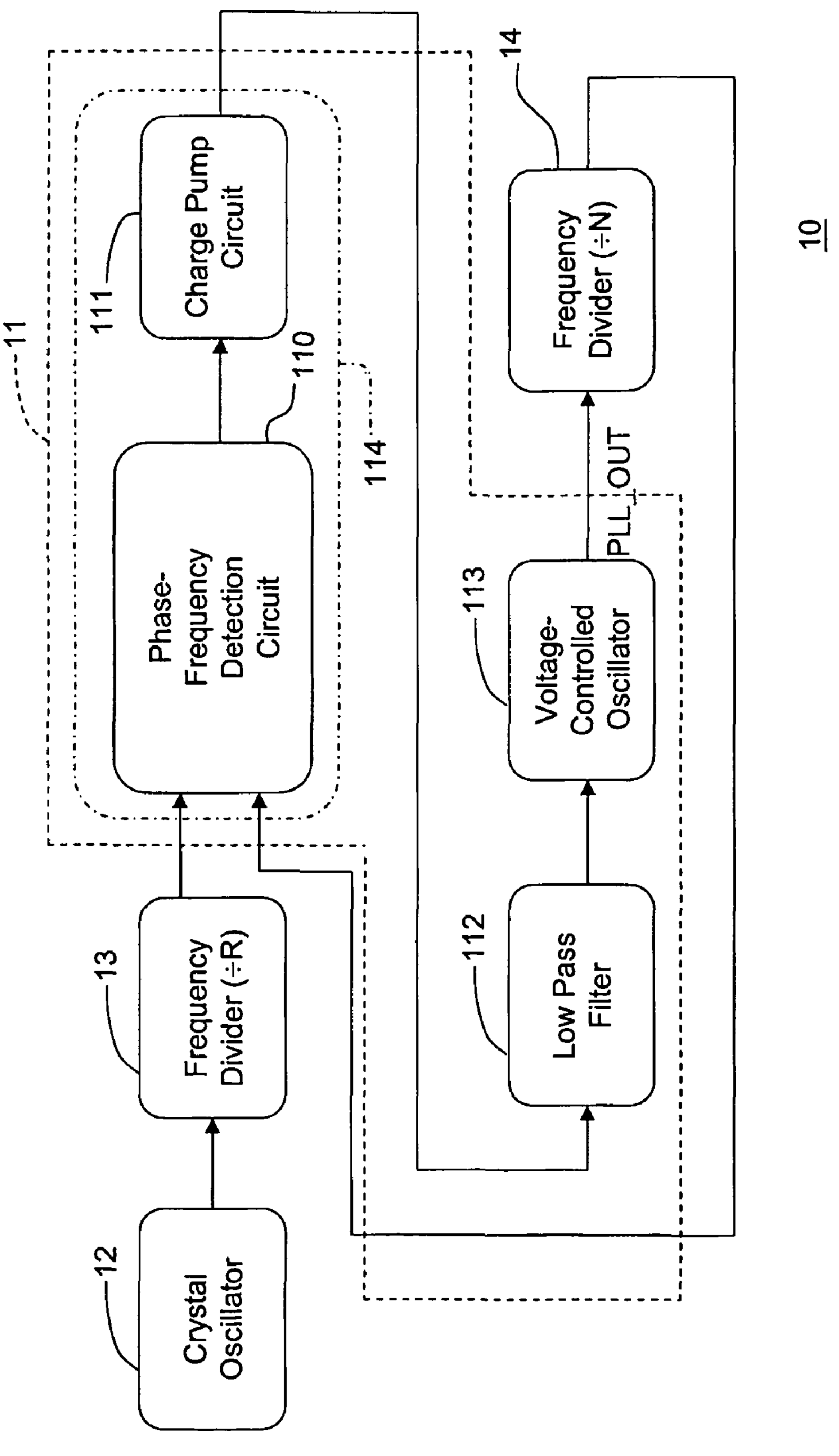
FIG. 1 (Prior Art)
FIG. 1 is a block diagram of a frequency synthesizer 10.
Figure 2:
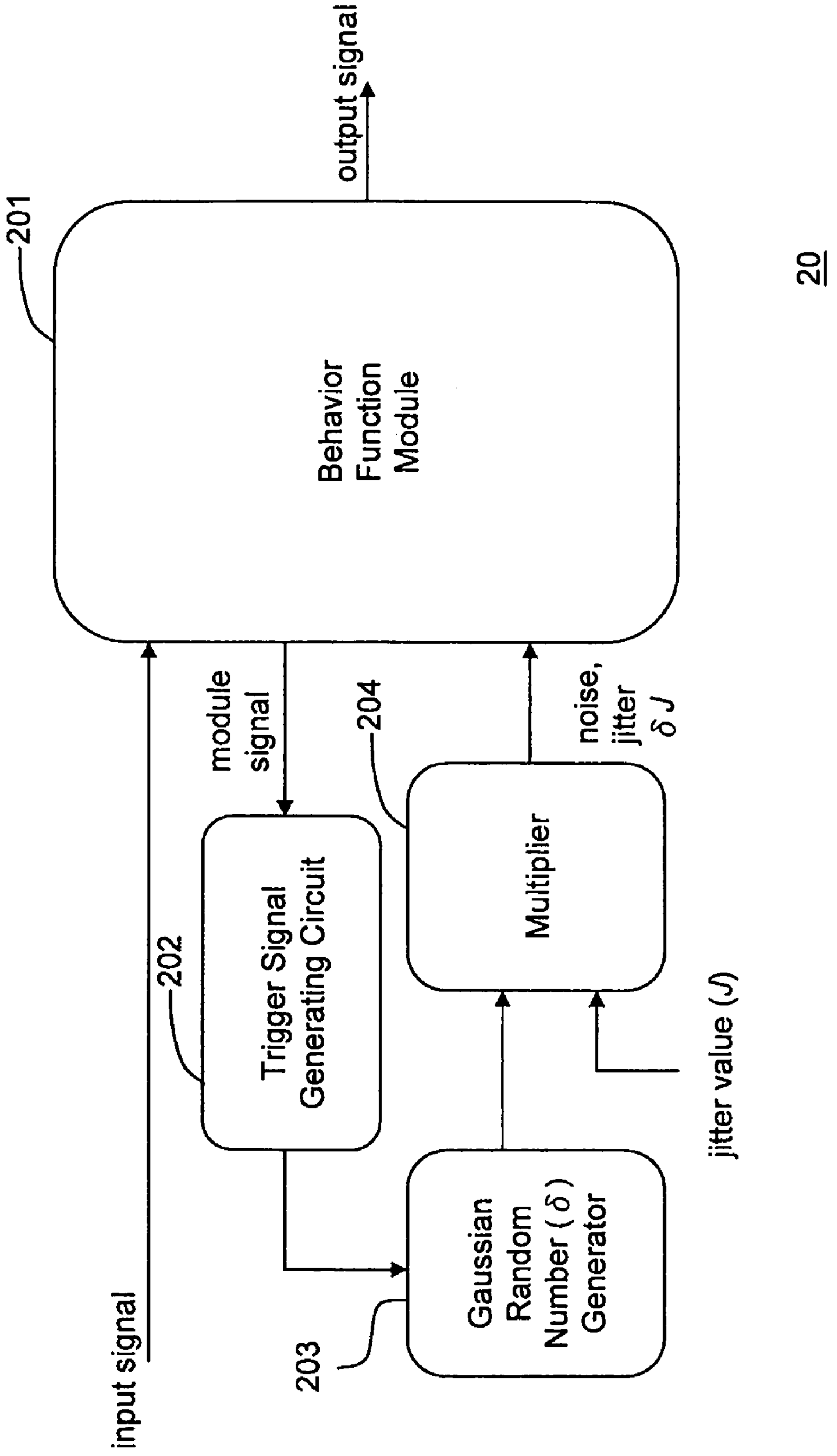
FIG. 2 (Prior Art)
FIG. 2 is a block diagram of a conventional apparatus 20 for simulating the system with the PLL when the phase noise is applied thereon.
Figure 3:
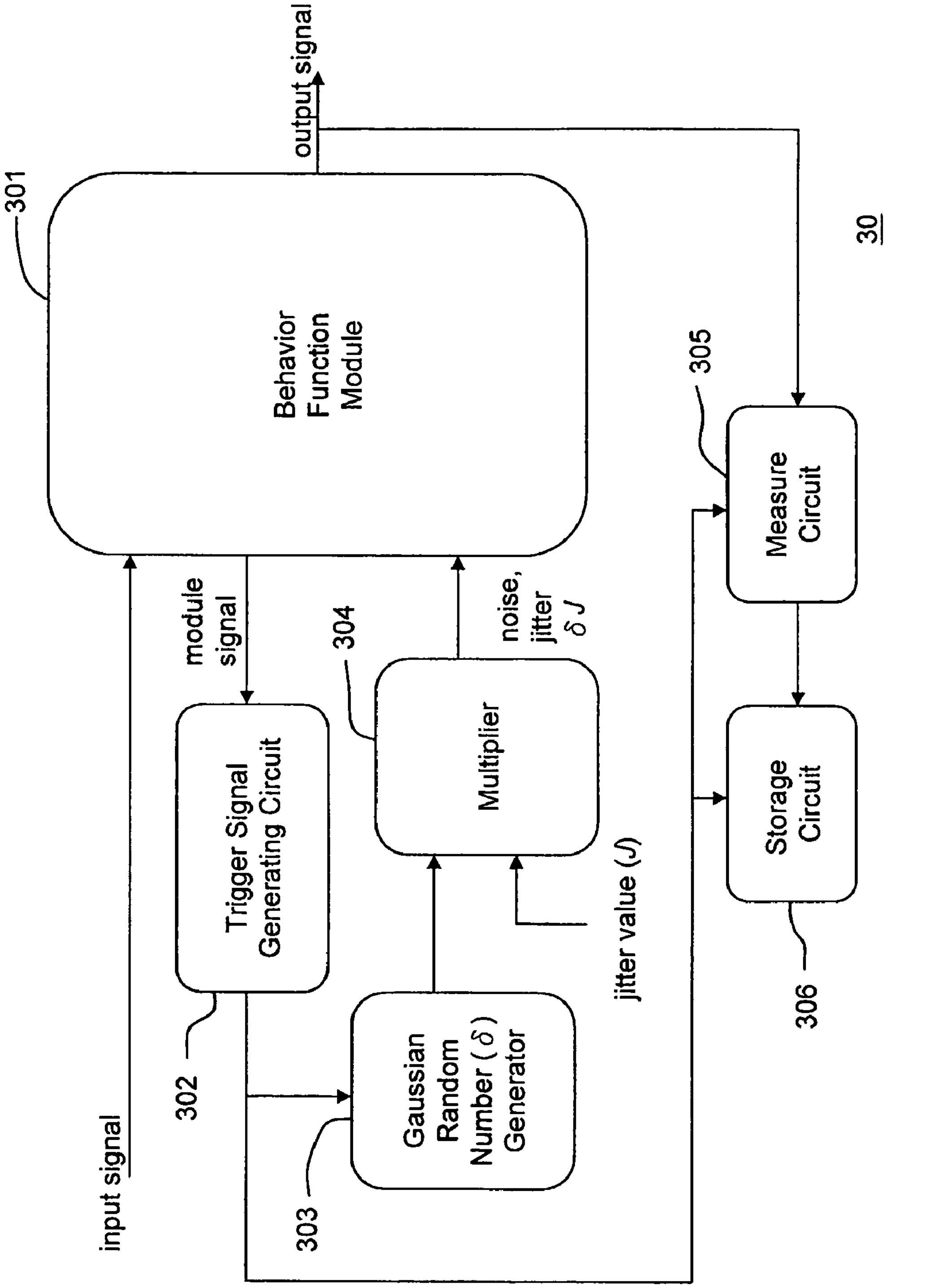
FIG. 3 (Prior Art)
FIG. 3 is a block diagram of another conventional apparatus 30 for simulating the system with the PLL when the phase noise is applied thereon.

Reference will now be made in detail to the present preferred embodiment of the invention, examples of which are illustrated in the accompanying drawings. Wherever possible, the same reference numbers are used in the drawings and the description to refer to the same or like parts.

A method and simulator for generating phase noise in a system with a phase-locked loop are disclosed. Each simulation block of the system with the PLL has its own predefined phase noise vector whose elements are injected consecutively at a trigger event. The element selection of the predefined noise vector is steered from the master element block, which is usually the voltage or current-controlled oscillator. Some simulation blocks, called semi-master element blocks, are self-triggered and determines their own injection frequency rate, but are reset-steered and aligned with the master element block as it start its capturing data phase, while other simulation blocks, called slave element blocks, are directly steered with the master element block.

The predefined noise vectors are of $N_{FFT}$ or $N_{FFT}+1$ length, where $N_{FFT}$ is a value to the power of 2. The predefined phase noise vectors are created from either analytical and theoretical noise spectrum or from transistor level noise spectrum simulations and transformed to time domain noise vectors by employing inverse fast Fourier transform function (IFFT) of point size $N_{FFT}$. Each time the controlled oscillator of the PLL injects a new element from the predefined noise vector, it also saves the period time into a data file. The system simulation stops when the output file is full, or of length $N_{FFT}$. The phase noise, jitter and spurs of the PLL in the system can be found by post-processing the output vector with a power spectral density (PSD) or FFT function of point size $N_{FFT}$.

The embodiments of the present invention are related to the existence of predefined noise vectors and how they are employed and injected timely in the behavioral model. In the embodiments of the present invention, multi-level simulation language Verilog-AMS is used to describe the behavior of the blocks of a system with a PLL, where the noise of each block of the system with a PLL is characterized, and predefined time domain noise vectors are generated and their elements are injected to the blocks of the system with the PLL in a synchronized controlled manner as jitter or noise.

In transferring transistor level circuits to abstract behavior level modules the complexity is greatly reduced resulting in faster yet accurate simulations for evaluating functionality as well as the characterization of noise, jitter and spur in a timely manner. Within the scope of the present invention's embodiments, the noise sources of each block of the system with the PLL is not limited by white Gaussian noise, but are instead based upon transistor level circuit simulation results or created by ideal noise spectra generated by script, which includes any kind of combination of slopes. The embodiments of the present invention are evolved from the PLL behavioral methodology described in Refs. 1-4.

Figure 5:
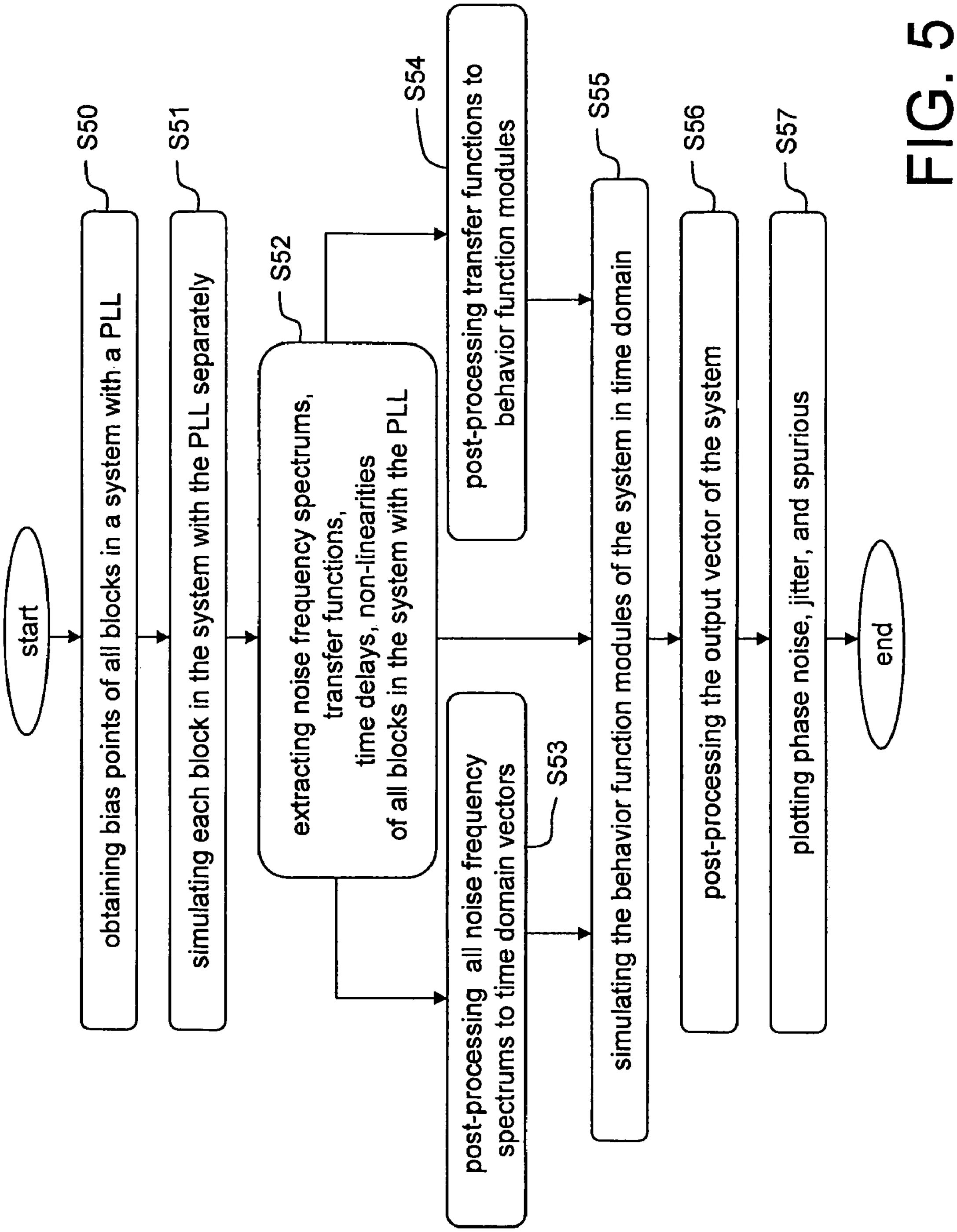
FIG. 5 is flow chart of a simulation in accordance with an embodiment of the present invention.

Referring to FIG. 5, FIG. 5 is flow chart of a simulation in accordance with an embodiment of the present invention. In step S50, bias points of all blocks in a system with a PLL are obtained. The bias points of all blocks may be obtained by performing the transistor level transient analysis of the entire system with the PLL. From this long simulation, the bias points and other information of interest can be extracted. It is noted that the implementation of step S50 is not used to limit the present invention. The bias points of all blocks may be obtained by simulating the frequency behavior of the voltage or current driven oscillator, and information of biasing conditions can be back calculated to the other blocks of the entire system. In addition, the bias points of all blocks may be obtained and known at beforehand.

In step S51, each block in the entire system with the PLL is simulated separately. The feedback frequency divider is often a digital circuit composed by many hundreds of switching transistors, which significantly increases the simulation time in transient analysis. The simulation time of the frequency divider and PLL is greatly improved if a behavioral model, reducing the number of total transistors, replaces the transistor level complex feedback divider. The step S51 will reduce much simulation time, since each block is simulated separately.

Then in step S52, much of information is extracted such as noise frequency spectrums, transfer functions, time delays, non-linearities and frequency characteristics of all blocks in the system with the PLL. The information is extracted based on the simulation result of each block operated at the bias point thereof. The information in step S52 is extracted from the separate simulation of each block in step S51. Then, some information may be passed directly to the step S55, and some information may be passed to the steps S53 and S54. In step S53, some information like all noise frequency spectrums are post-processed to the time domain vectors. In step S54, the transfer functions are post-processed 310 to appropriate formats to keep the simulation time of the time domain behavior function modules to a minimum while keeping accuracy. It is noted that steps S52, S53, and S54 may be performed without simulation data, and instead be based upon theoretical data. In short, the steps S52, S53, and S54 are not used to limit the present invention.

In step S55, the behavior function modules of the system in time domain is simulated. Since all required information is obtained in step S55, the behavioral model of the system in time domain can be simulated based on the required information. How to construct the simulator of the behavioral model of the system in time domain is illustrated later. In step S56, the output vector of the system is post-processed, wherein the output vector is obtained after the behavioral model of the system in time domain is simulated. In step S57, the phase noise, jitter, and spur of the interested block are plotted based on the post-processed output vector which obtained in step S56.

It is noted that the transistor level simulations of each block may be performed with tools such as Eldo-RF from Mentor Graphics and Spectre-RF from Cadence Design System. The post-processing steps both prior to and after behavioral simulation can be performed with a tool such as MATLAB® or directly from scripts written in a programming language such as C, both methods have been implemented and tested with the same accurate result. Behavioral model simulations have been carried out in both Simulink and Verilog-AMS environments, although the method itself is not limited to a specific tool.

Figure 6:
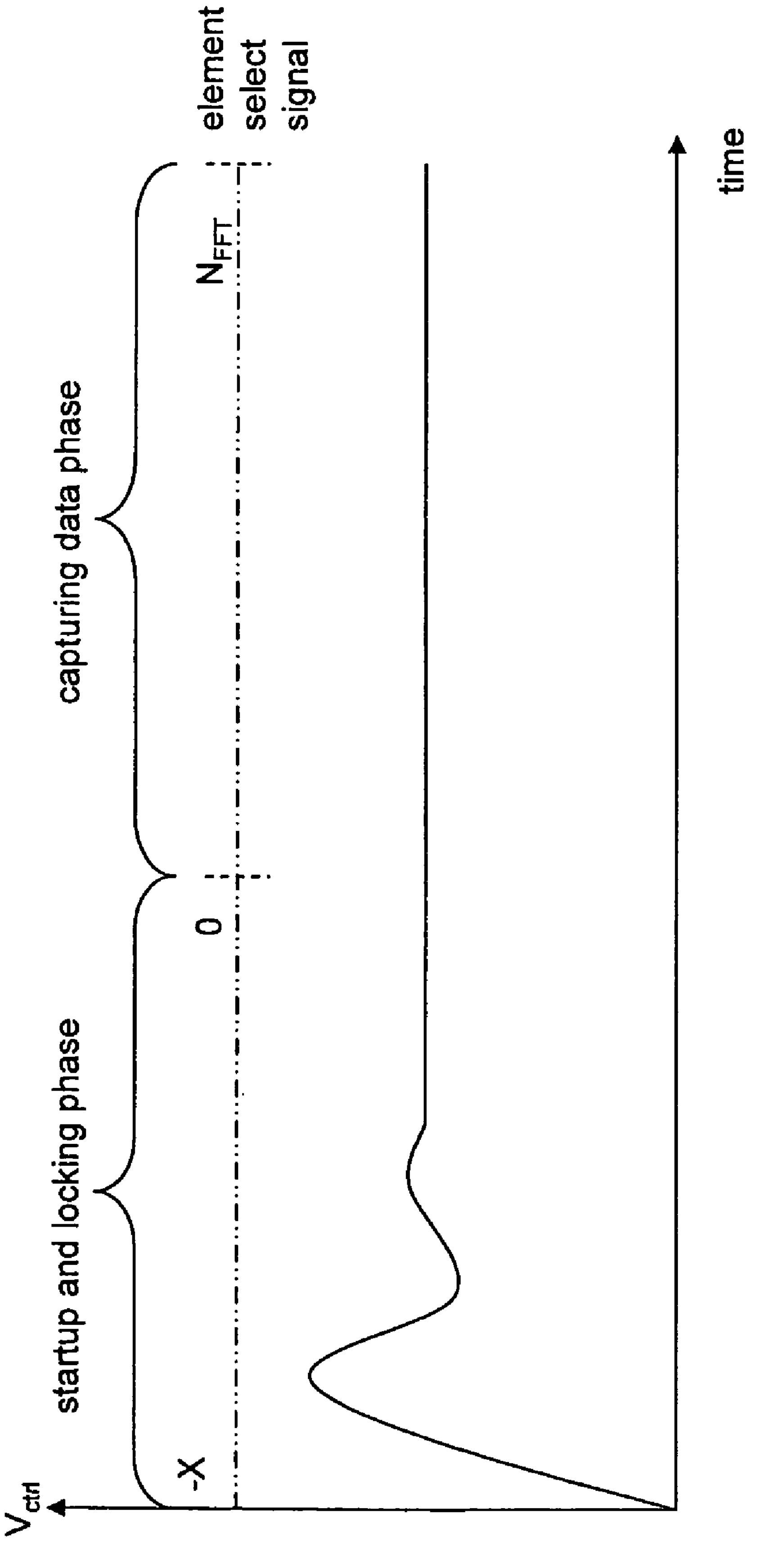
FIG. 6 is an oscillogram of an output voltage of a low pass filter of the system with the PLL in time domain.

Referring to FIG. 6, FIG. 6 is an oscillogram of an output voltage of a low pass filter of the system with the PLL in time domain. The output voltage of the low pass filter goes through a start-up and locking phase followed by settling stage where data can start to be collected, called capturing data phase. During the start-up and locking phase, the element select signal from the voltage or current-controlled oscillator, will start to count from an initial negative value −X to zero. The negative value has to be chosen little enough to enable the PLL to lock and settle before the capturing data phase can commence. When the element select signal reaches a number $N_{FFT}$, the simulation is stopped and the output is saved into a storage circuit or a file. It is noted that the data collected in the start and locking phase may be dropped without taking into the consideration of simulation.

Referring to FIGS. 7A-7D, FIGS. 7A-7D are block diagrams illustrating simulators 70-73 of the behavioral models of the four systems with the PLLs. Each block has a predefined noise vector injected therein. The predefined noise vectors of some simulation blocks in FIGS. 7A-7D are steered by the counters thereof, and some are controlled by counter reset signals from the voltage or current-controlled oscillators. The present invention is not limited to these 4 cases, the purpose of illustrating these 4 cases is to state how various systems with the PLLs can be implemented with the embodiments of the present invention. Generally all each system with the PLL is a frequency synthesizer. The frequency synthesizer in these four cases may adopt the voltage-controlled oscillator (such as FIGS. 7B and 7D), or the current-controlled oscillator (such as FIGS. 7A and 7C). In addition, the frequency synthesizer may have a pre-divider (such as FIGS. 7A and 7B), or have no pre-dividers (such as FIGS. 7C and 7D).

Figure 7A:
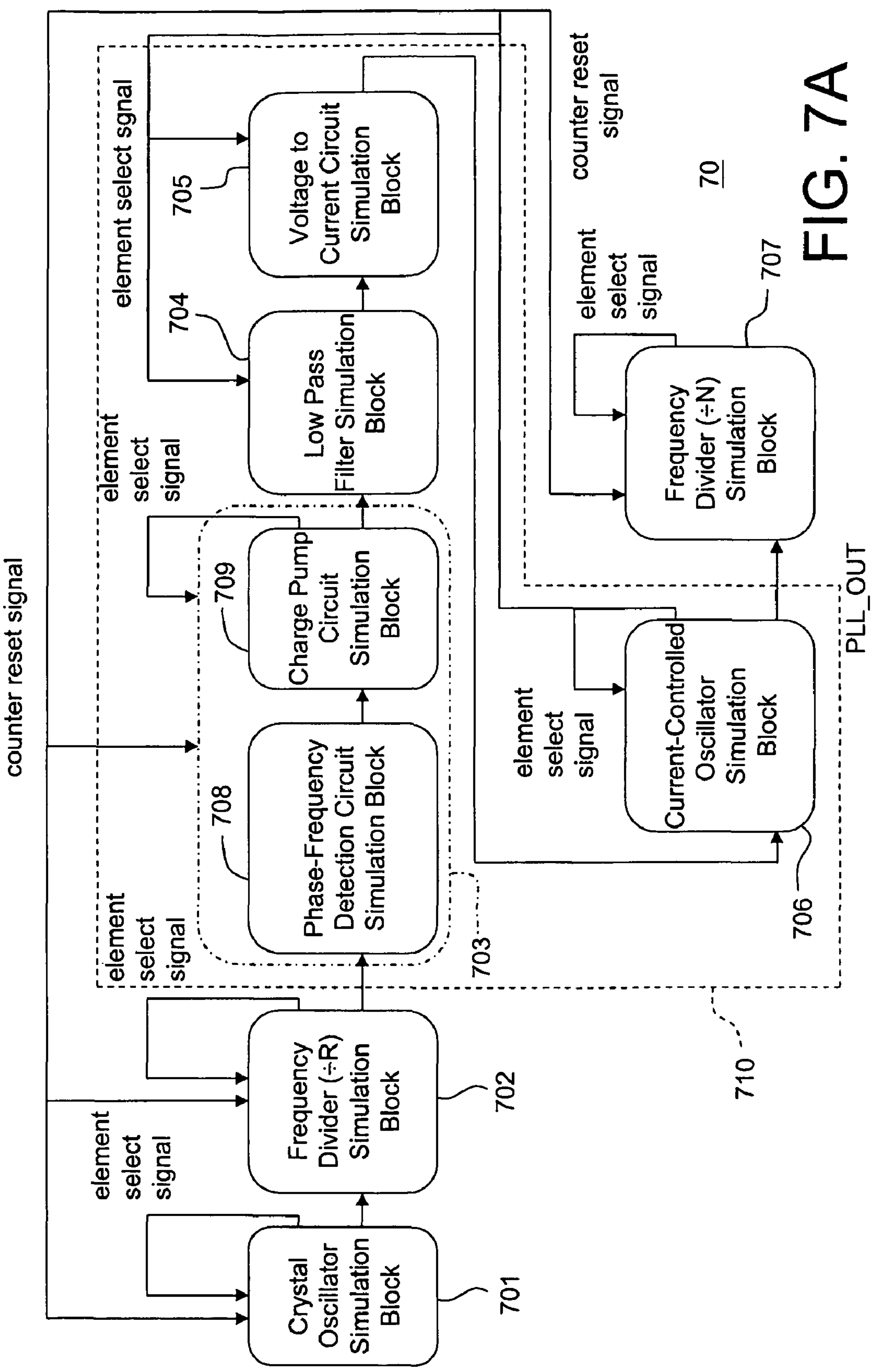
FIGS. 7A-7D are block diagrams illustrating simulators 70-73 of the behavioral models of the four systems with the PLLs.

In FIG. 7A, the simulator 70 of the system comprises a crystal oscillator simulation block 701, frequency divider simulation blocks 702, 707, a PFD/CP simulation block 703, a low pass filter simulation block 704, a voltage to current circuit simulation block 705, and a current-controlled oscillator simulation block 706. The PFD/CP simulation block comprises a phase-frequency detection circuit simulation block 708 and a charge pump circuit simulation block 709. Wherein, the PFD/CP simulation block 703, the low pass filter simulation block 704, the voltage to current circuit simulation block 705, and the current-controlled oscillator simulation block 706 form a PLL simulation bock 710. The connection of all simulation blocks is shown in FIG. 7A, and not described herein.

All simulation blocks in the simulator 70 of the system have their own designated predefined noise vectors. All simulation blocks in the simulator 70 may be classified into three module blocks, master element block, slave element block, and semi-master element block. The current-controlled oscillator simulation block 706 is the master element block which outputs an element select signal to itself and the slave element block, such as the low pass filter simulation block 704 and the voltage to current circuit simulation block 705. The slave element blocks do not output any element select signal, but only receive the element select signal output from the master element block.

The predefined noise vectors in the master and slave element blocks are steered by the element select signal output from the master element block. The element select signal output from the master element block also serves as the counter reset signal to the semi-master element blocks, such as the crystal oscillator simulation block 701, the frequency divider simulation blocks 702, 707, and the PFD/CP simulation block 703. Each of the semi-master element blocks outputs an element select signal to itself. Therefore, the predefined noise vector in each semi-master element block is steered by the counter reset signal and the element select signal thereof, and the master element block can synchronize all of the simulation blocks.

In accordance with an embodiment of the present invention the noise type of the PFD/CP simulation block 703, the low pass filter simulation block 704, and the voltage to current circuit simulation block 705 is represented by a general thermal noise type. The predefined noise vectors of the low pass filter simulation block 704 and the voltage to current circuit simulation block 705 are directly controlled by the current-controlled oscillator simulation block 706, since the low pass filter simulation block 704 and the voltage to current circuit simulation block 705 do not possess any natural internal triggers. As the crystal oscillator simulation block 701, the frequency divider simulation blocks 702, 707, the PFD/CP simulation block 703, and the current-controlled oscillator simulation block 706 possess natural internal triggers which can determine their own trigger events and increment element select signal. Furthermore, the crystal oscillator simulation block 701, the frequency divider simulation blocks 702, 707, and the PFD/CP simulation block 703 need their counters reset to the start of the vector, 0, as soon as the current-controlled oscillator 706 starts to collect the output data.

Figure 7B:
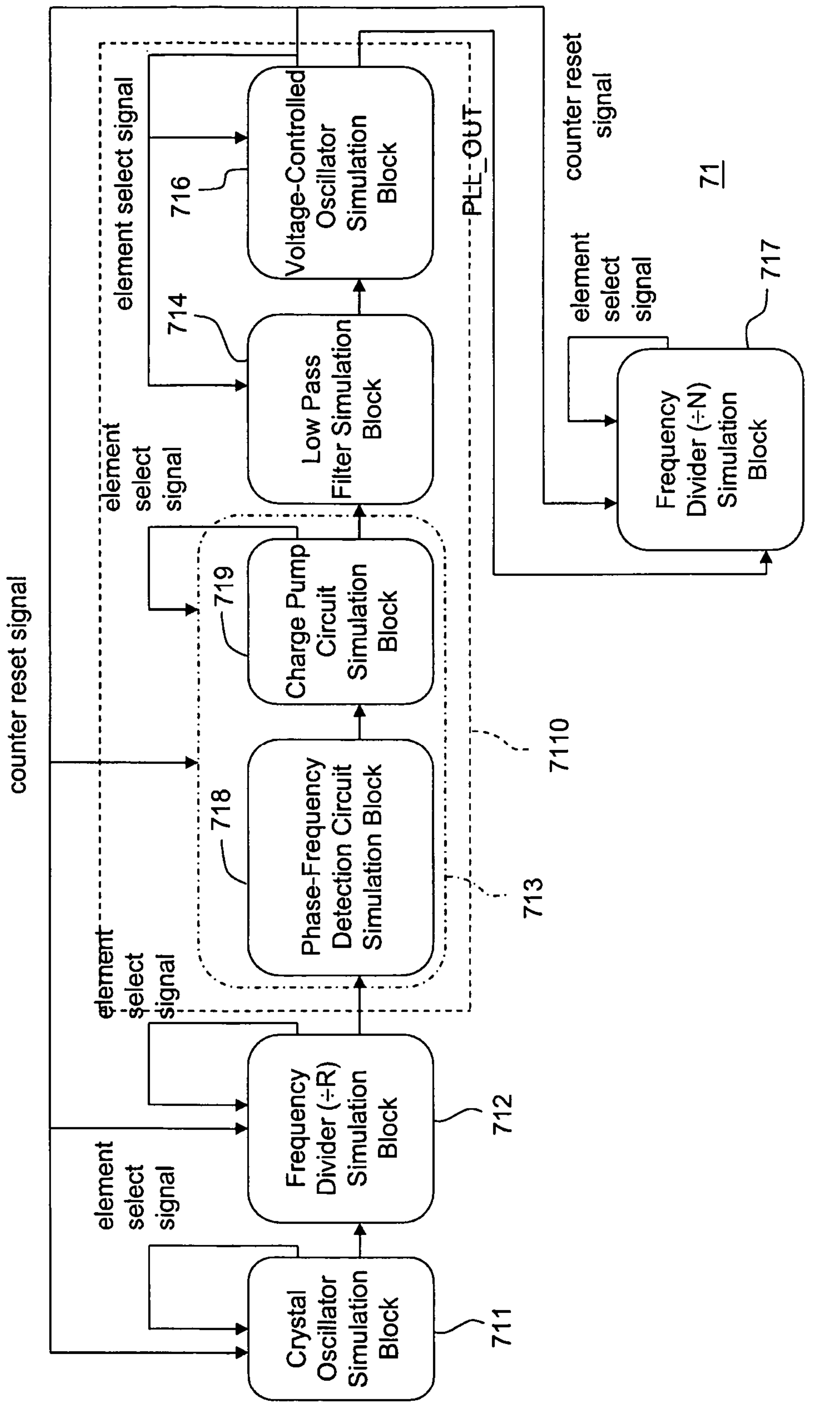

In FIG. 7B, the PLL simulation block 7110 in the simulator 71 of the system adopts a voltage-controlled oscillator simulation block 716. Therefore, the master element block is the voltage-controlled oscillator simulation block 716. The crystal oscillator simulation block 711, the frequency divider simulation blocks 712, 717, and the PFD/CP simulation block 713 are the semi-master element blocks, and the low pass filter simulation block 714 is the slave element block.

Figure 7C:
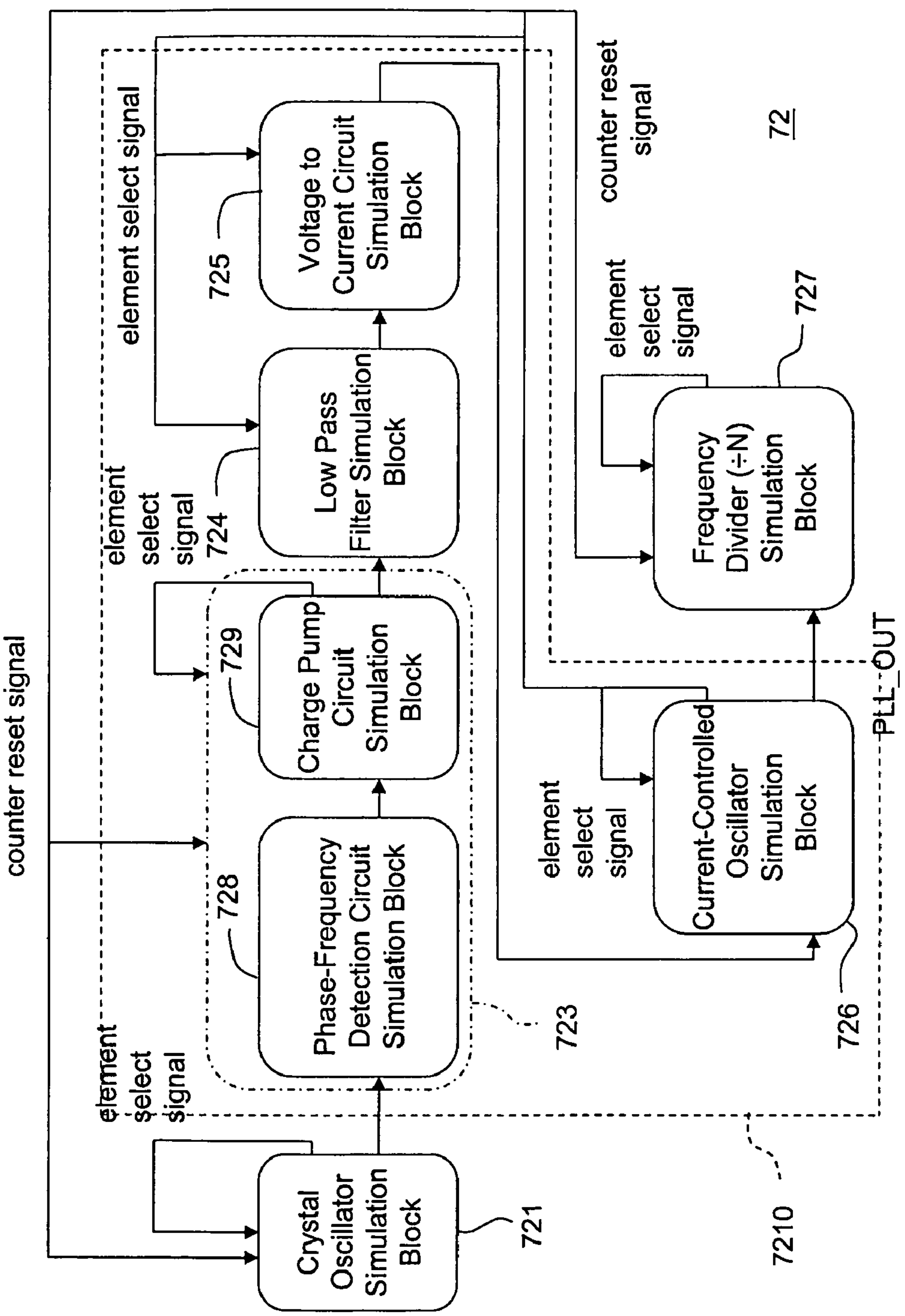

In FIG. 7C, the PLL simulation block 7210 in the simulator 72 of the system adopts a current-controlled oscillator simulation block 726. Therefore, the master element block is the current-controlled oscillator simulation block 726. The crystal oscillator simulation block 721, the frequency divider simulation block 727, and the PFD/CP simulation block 723 are the semi-master element blocks, and the low pass filter simulation block 714 and the voltage to current circuit simulation block 725 are the slave element blocks. The PFD/CP simulation block 723 contains a phase-frequency detection circuit simulation block 728 and a charge pump circuit simulation block 729. A low pass filter simulation block 724 is located between the PFD/CP simulation block 723 and the voltage to current circuit simulation block 725.

Figure 7D:
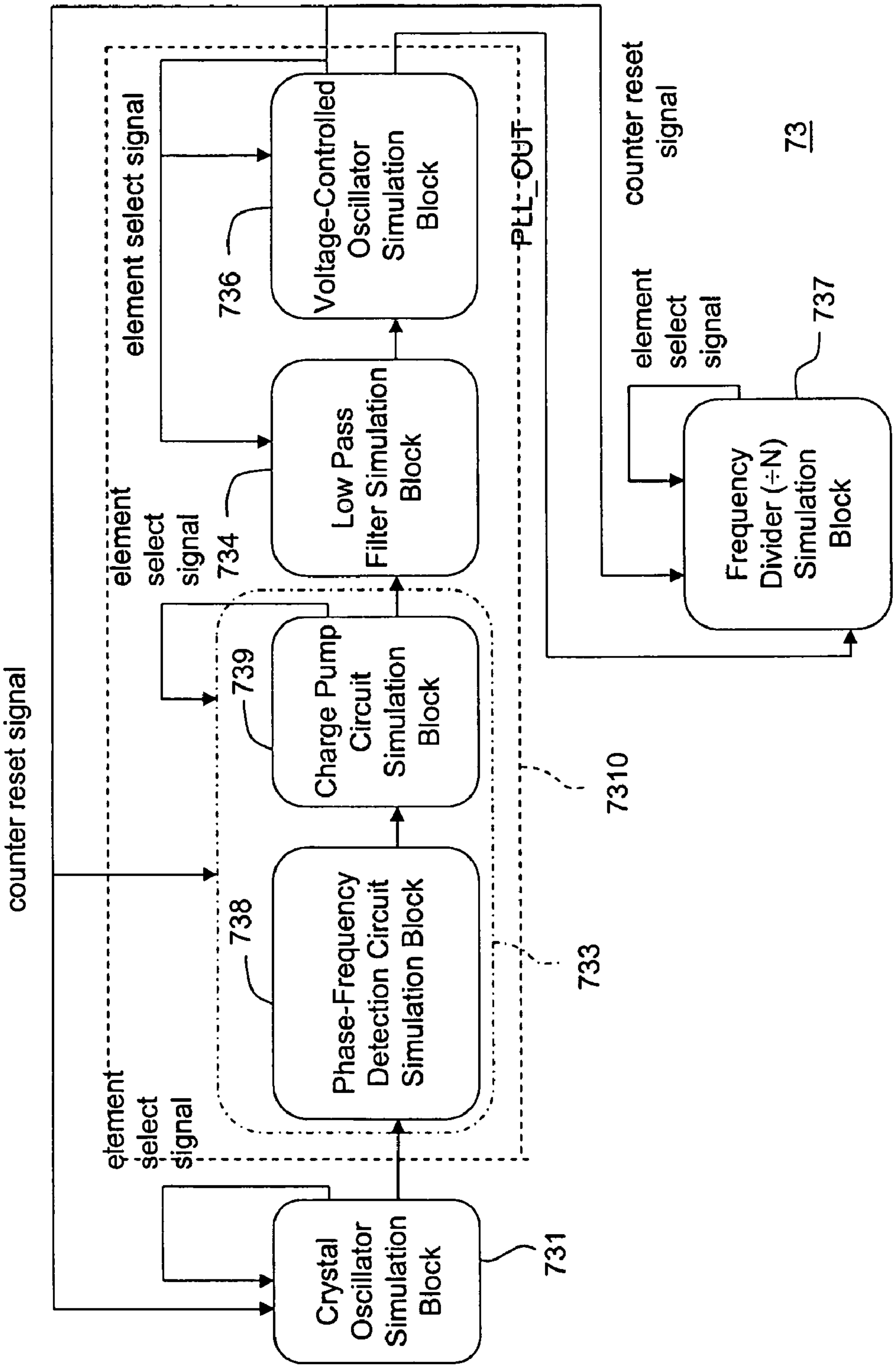

In FIG. 7D, the PLL simulation block 7310 in the simulator 73 of the system adopts a current-controlled oscillator simulation block 736. Therefore, the master element block is the current-controlled oscillator simulation block 736. The crystal oscillator simulation block 731, the frequency divider simulation block 737, and the PFD/CP simulation block 733 are the semi-master element blocks, and the low pass filter simulation block 734 is the slave element block. The PFD/CP simulation block 733 contains a phase-frequency detection circuit simulation block 738 and a charge pump circuit simulation block 739.

Figure 8:
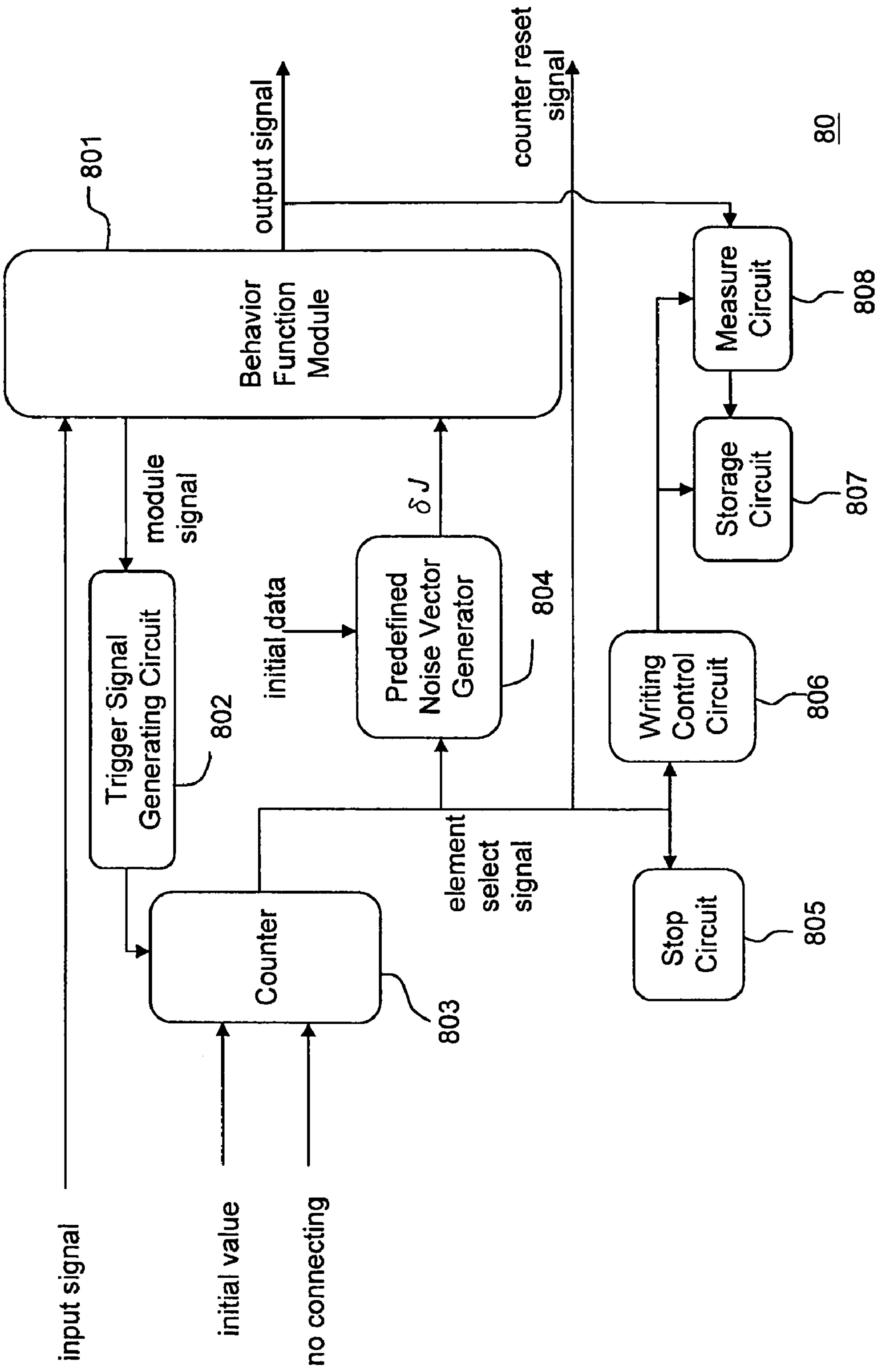
FIG. 8 is a block diagram of the master element block 80 according to the embodiment of the present invention.

Referring to FIG. 8, FIG. 8 is a block diagram of the master element block 80 according to the embodiment of the present invention. As described above, the master element block 80 is usually the current or voltage-controlled oscillator simulation block. The master element block 80 comprises a behavioral function module 801, a trigger signal generating circuit 802, a counter 803, a predefined noise vector generator 804, a stop circuit 805, a writing control circuit 806, a storage circuit 807, and a measure circuit 808.

The behavior function module 801 is the behavior function of the corresponding circuit. Take FIG. 7A as an example, the behavior function module 801 is the behavior function of the current-controlled oscillator. The behavior function module 801 receives an input signal and outputs a module signal based on the input signal. The trigger signal generating circuit receives the module signal and updates its state in response to the module signal, and then outputs a trigger signal to the counter 803.

The reset terminal of the counter 803 is floated without connecting. An initial value is input to the counter 803, so that the counter 803 counts from the initial value. The counter 803 counts and outputs the element select signal. The predefined noise generator 804 reads initial data to generate the predefined noise vector during the simulation initialization, and selects one element of the predefined noise vector to output in response to the element select signal. The stop circuit 805 stops the simulation of the whole master element block 80 when the element select signal is equal to the number $N_{FFT}$ of the IFFT point size. The element select signal is output to the slave element blocks, and serves as the counter reset signal to the semi-master element blocks.

The behavior function module 801 receives the input signal and the phase noise (jitter or spur) δJ, and outputs an output signal based on the input signal, the phase noise δJ, and its behavior function. The initial value may be −X, which will make the master element block discarding the output signals generated in the start and locking phase. While the element select signal is counted to be zero, the writing control circuit 806 indicates the measure circuit 808 to buffer the output signals generated in the capturing data phase, and indicates the storage circuit to save the content buffered in the measure circuit 808.

While the element select signal counted to be the number $N_{FFT}$ of the IFFT point size, the writing control circuit 806 indicates the measure circuit 808 to output the period of the capturing data phase to the storage unit, and indicates the storage circuit to save the period of the capturing data phase. Therefore, the period of the capturing data phase and the output signals in the capturing data phase are saved into a file. Accordingly, the file can be analysis or observed by the chip designer, and the phase noise of the system with the PLL can be modeled.

Figure 4:
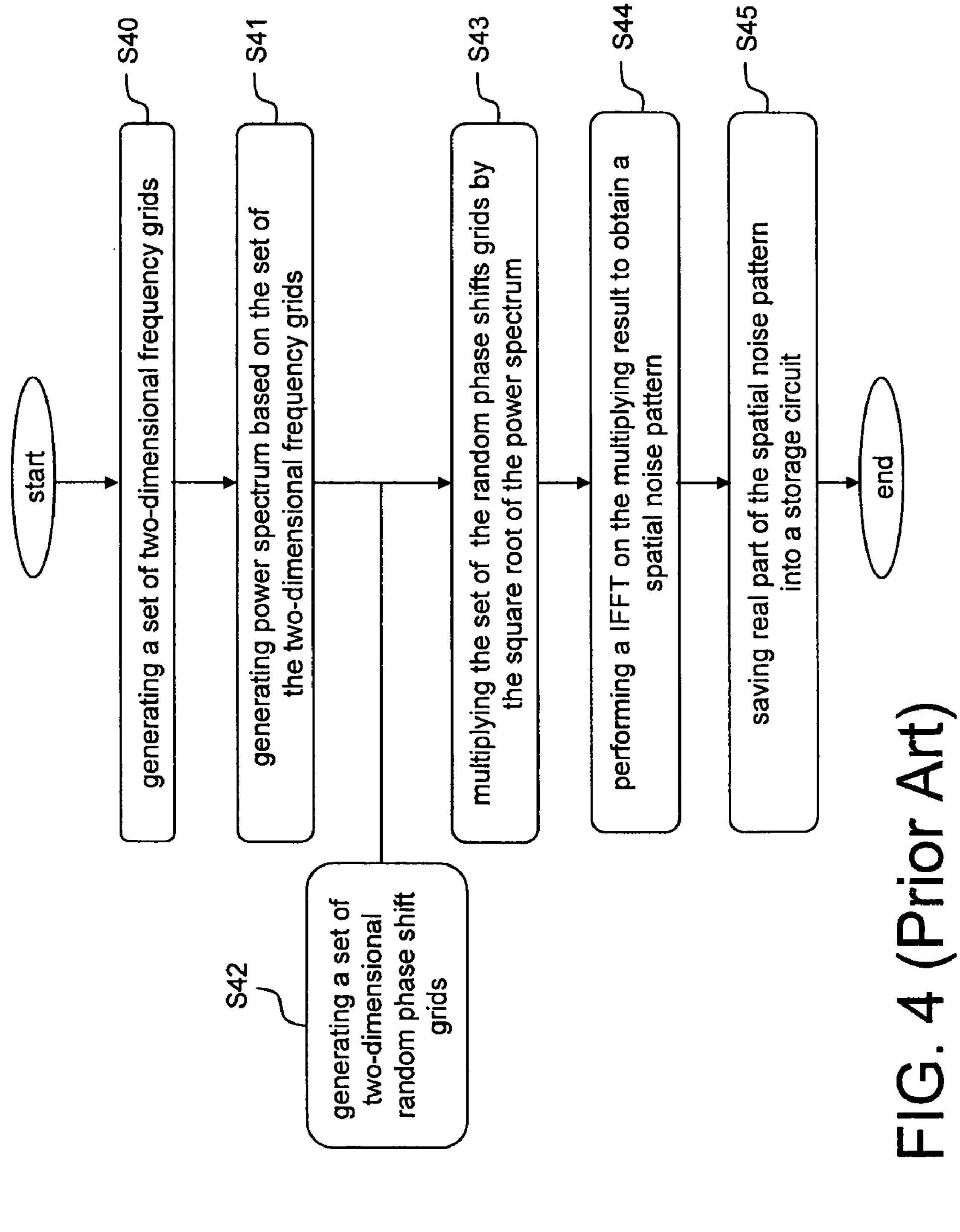
FIG. 4 (Prior Art)
FIG. 4 is a flow chart of the conventional method for generating a spatial noise pattern (in time domain), which is disclosed in Ref. 5.

It is noted that writing control circuit 806, measure circuit 808, and the storage circuit 807 may be moved out off the master element block 80 into a separate module by itself to create a more general system for noise analysis, for other circuits such as sigma-delta modulators or a digital PLL. The phase noise δJ is of arbitrary noise spectrum, either from a simulation or from a theoretical noise spectrum script, and hence is not limited by white noise and a zero-mean unit variance, thus greatly improving the accuracy of predicting the phase noise of the system with the PLL. One implementation to generate the predefined noise vector is described in FIG. 4. However the method provided in FIG. 4 is only for single slope, the other implementations to generate the predefined noise vector are described later.

In addition, take notice of the initial value. The initial value is set to a negative value which is little enough to let the system output lock and settled before the data capturing phase starts, as shown in FIG. 6. In order to avoid spurious signals generated due to the start-up and lock phase, it is important to let the system lock and settled before collecting the output signals in the period of the capturing data phase.

Figure 9:
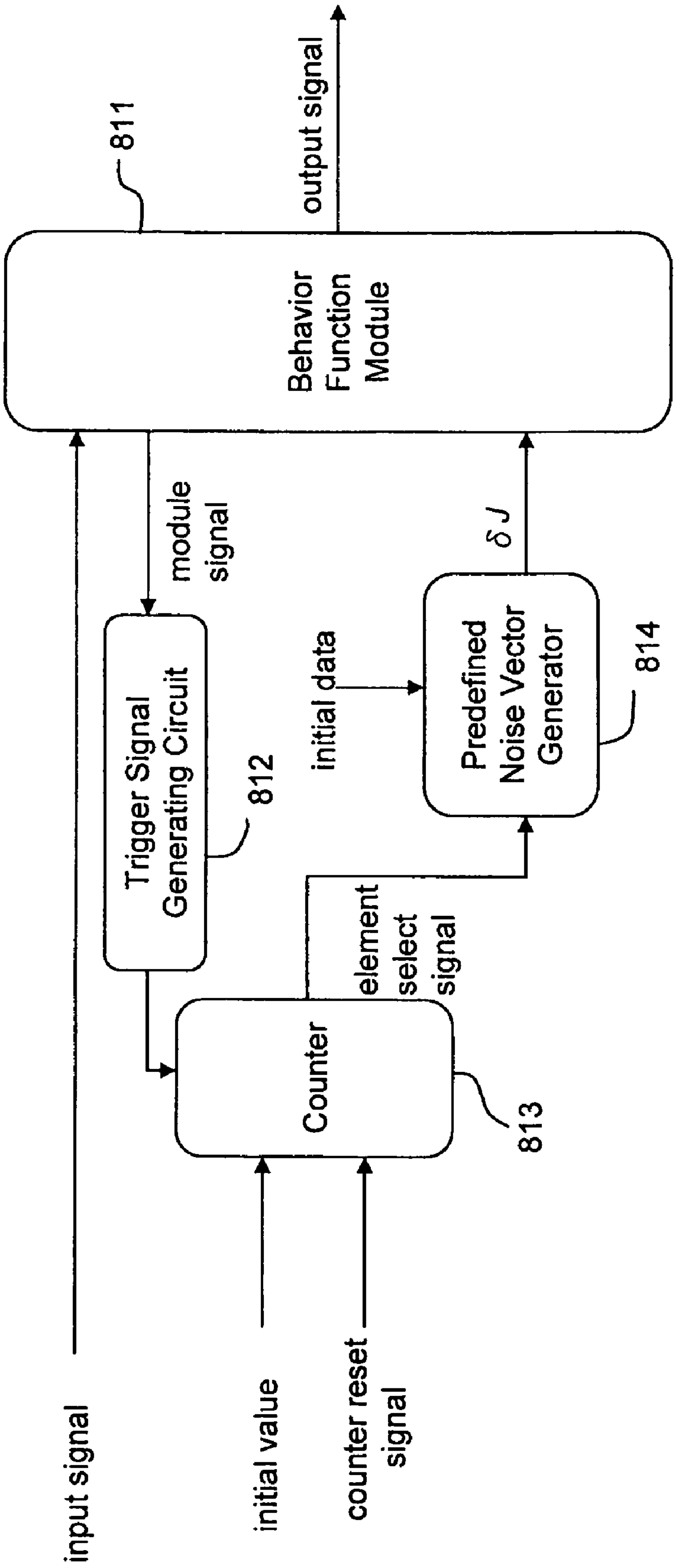
FIG. 9 is a block diagram of a semi-master element block 81 according to the embodiment of the present invention.

Referring to FIG. 9, FIG. 9 is a block diagram of a semi-master element block 81 according to the embodiment of the present invention. As described above, the semi-master element block 81 is usually the crystal oscillator simulation block, the frequency divider simulation block, or the FPD/CP simulation block. That is, the semi-master element block 81 is a self-triggered simulation block, which needs its predefined noise vector to be reset to 0, so that it is aligned with the data capturing phase set by the master element block. The semi-master element block 81 comprises a behavioral function module 811, a trigger signal generating circuit 812, a counter 813, and a predefined noise vector generator 814.

The behavior function module 811 is the behavior function of the corresponding circuit. Take FIG. 7A as an example, the behavior function module 811 is the behavior function of the crystal oscillator, the frequency divider, or the PFD/CP block. The behavior function module 811, the trigger signal generating circuit 812, the counter 813, and the predefined noise vector generator 814 are respectively similar to those in FIG. 8, and will not be described again herein.

It is noted that the reset terminal of the counter 813 receives the counter reset signal output from the master element block, and thus it is aligned with the data capturing phase set by the master element block. In addition, the length the predefined noise vector of the semi-master element block 81 may be different from that of the master element block. The counters of the master and semi-master element blocks will all start counting at 0 and in the best of cases end at their own last vector element. However, due to various lengths of the predefined noise vectors, system non-linearities, fractional or sigma-delta dividers in the feedback loop and other effects, some predefined noise vectors might not end at their last vector element. The error made in such cases is often negligible due to the large vector size used. For large divider ratios, very long predefined noise vectors of the voltage-controlled oscillator simulation block, the current-controlled oscillator simulation block, the voltage to current simulation block, the low pass filter simulation block and the PFD/CP simulation block are needed to cover, for instance, the ends of the crystal oscillator simulation block and the frequency divider simulation block in phase noise correctly.

Figure 10:
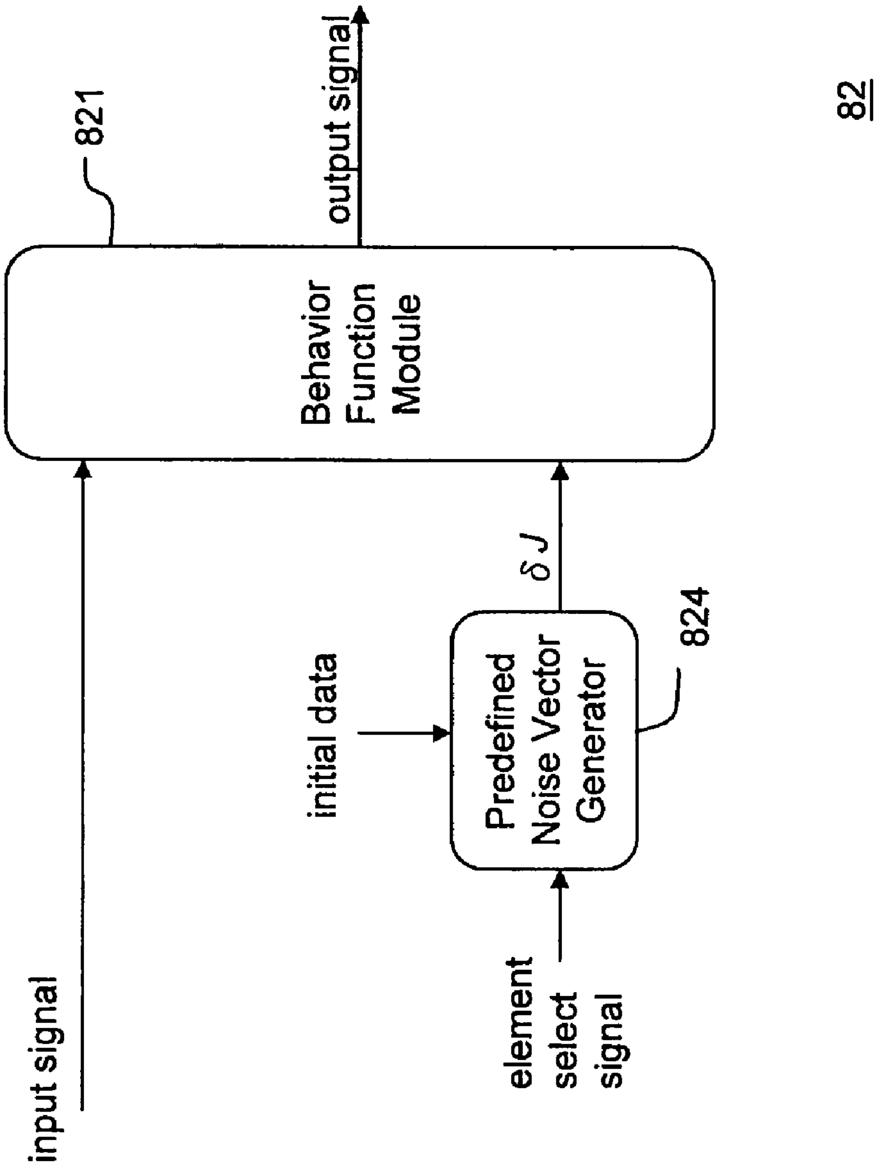
FIG. 10 is a block diagram of a slave element block 82 according to the embodiment of the present invention.

Referring to FIG. 10, FIG. 10 is a block diagram of a slave element block 82 according to the embodiment of the present invention. As described above, the slave element block 82 is usually the low pass filter simulation block, or the voltage to current circuit simulation block. That is, the slave element block 82 is a non-self-triggered simulation block. The slave element block 82 comprises a behavioral function module 821 and a predefined noise vector generator 824.

The behavior function module 821 is the behavior function of the corresponding circuit. Take FIG. 7A as an example, the behavior function module 821 is the behavior function of the low pass filter, or the voltage to current circuit. The behavior function module 821 and the predefined noise vector generator 824 are respectively similar to those in FIG. 8, and will not be described again herein. It is noted that the predefined noise vector generator 824 receives the element select signal output from the master element block, and therefore, the slave element block 82 is synchronized and triggered by the master element block.

Figure 11:
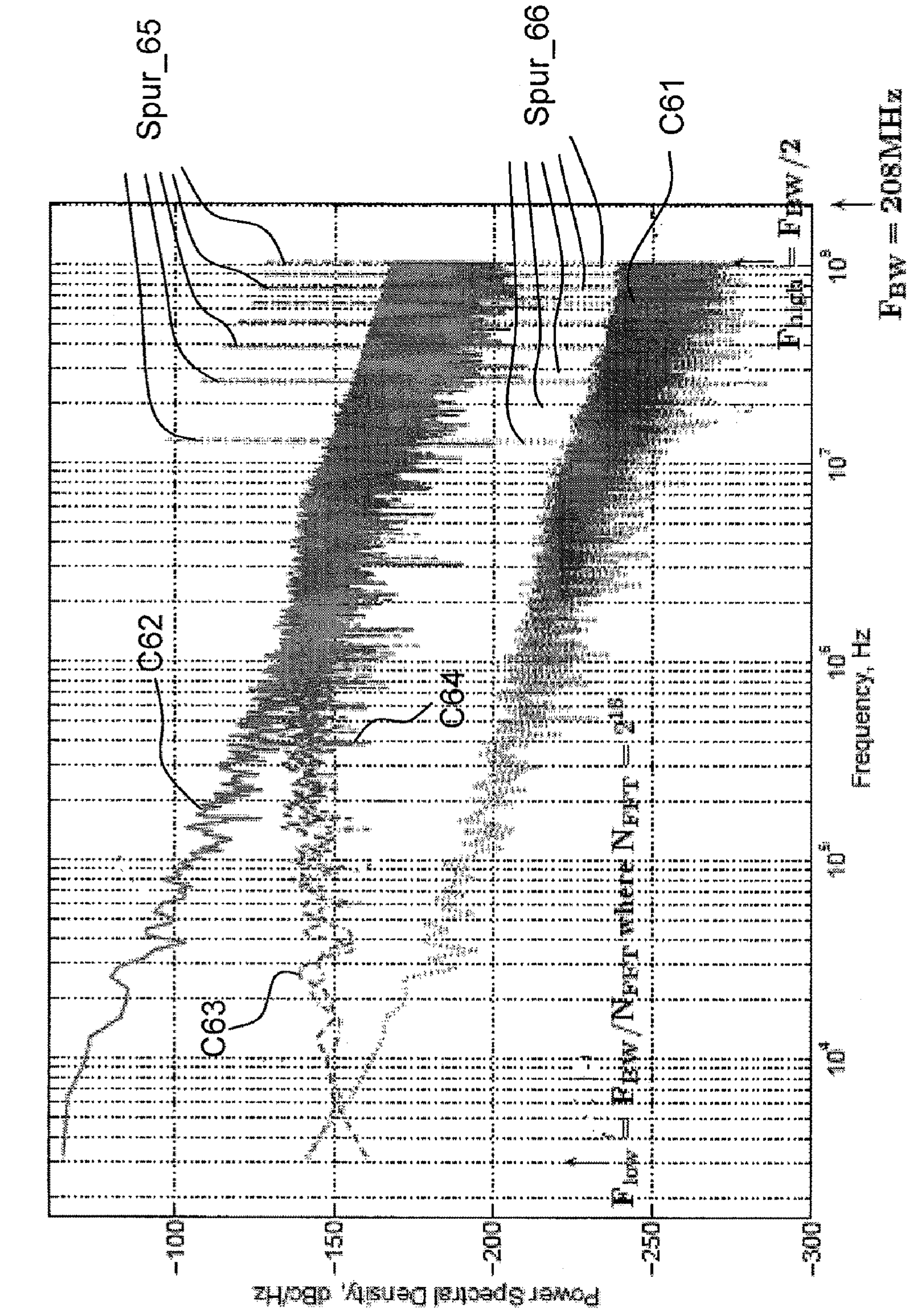
FIG. 11 is a curve diagram of the output phase noise of the PLL after being post-processed in the system.

Referring to FIG. 11, FIG. 11 is a curve diagram of the output phase noise of the PLL after being post-processed in the system. The abscissa shows the offset frequency in Hertz of the PLL output frequency $F_{BW}$, and the ordinate shows the power spectral density in dBc/Hz. The curve C61 shows the noise floor of the simulation when all noise sources are turned off. The latter simulation is always recommended in order to reveal any numerical oddities that might have occurred due to the ideally described behavioral models. Once the noise floor is documented, noise simulations can be made. A good practice is to turn on the noise sources one by one to see their individual impact to the output, and then all noise sources can be turned on for the final simulation.

The curve C62 shows the controlled oscillator's phase noise, which includes white and flicker oscillator shaped noise. The curve C64 shows the PLL output phase noise of a Verilog-AMS simulation when only the controlled oscillator's noise is turned on. The curve C63 shows the PLL output phase noise of a linear domain calculation of the controlled oscillator noise including its theoretical transfer function, as can be seen it corresponds well to the curve C64 of the time domain Verilog-AMS simulation.

The vector frequency injection rate is set to $F_{BW}$=208 MHz. Due to Nyquist stability criterion only frequencies up to $F_{high}=F_{BW}/2$ can be observed, whereas the lowest frequency is set by $F_{low}=F_{BW}/N_{FFT}$ here set to $N_{FFT}$=216. The Verilog-AMS simulated curves C 61 and C64 clearly show existence of spurs Spur_65 and Spur_66 at the output of the PLL, even when the noise is turned off, which demonstrates that the spurs Spur_65 and Spur_66 are present due to the non-linearities and the integer frequency divider in the feedback loop. The behavior function of the PLL may be replaced one at the time by their transistor circuit level counterparts if all the Verilog-AMS codes are wrapped in, for instance, Spice netlists and the simulator engine is Spice based. The noise spectra of the new transistor level blocks will then be limited to the number of points saved at the output.

The system with the PLL may further comprises other blocks such as self-biasing circuits and buffers, where those skilled in the art can see other areas where it can be applied, with the techniques and methods described by the embodiments of the present invention. The embodiments of the present invention are applicable for other systems and simulations sigma-delta modulators, digital PLLs, where those skilled in the art can see other areas where it can be applied.

Figure 12:
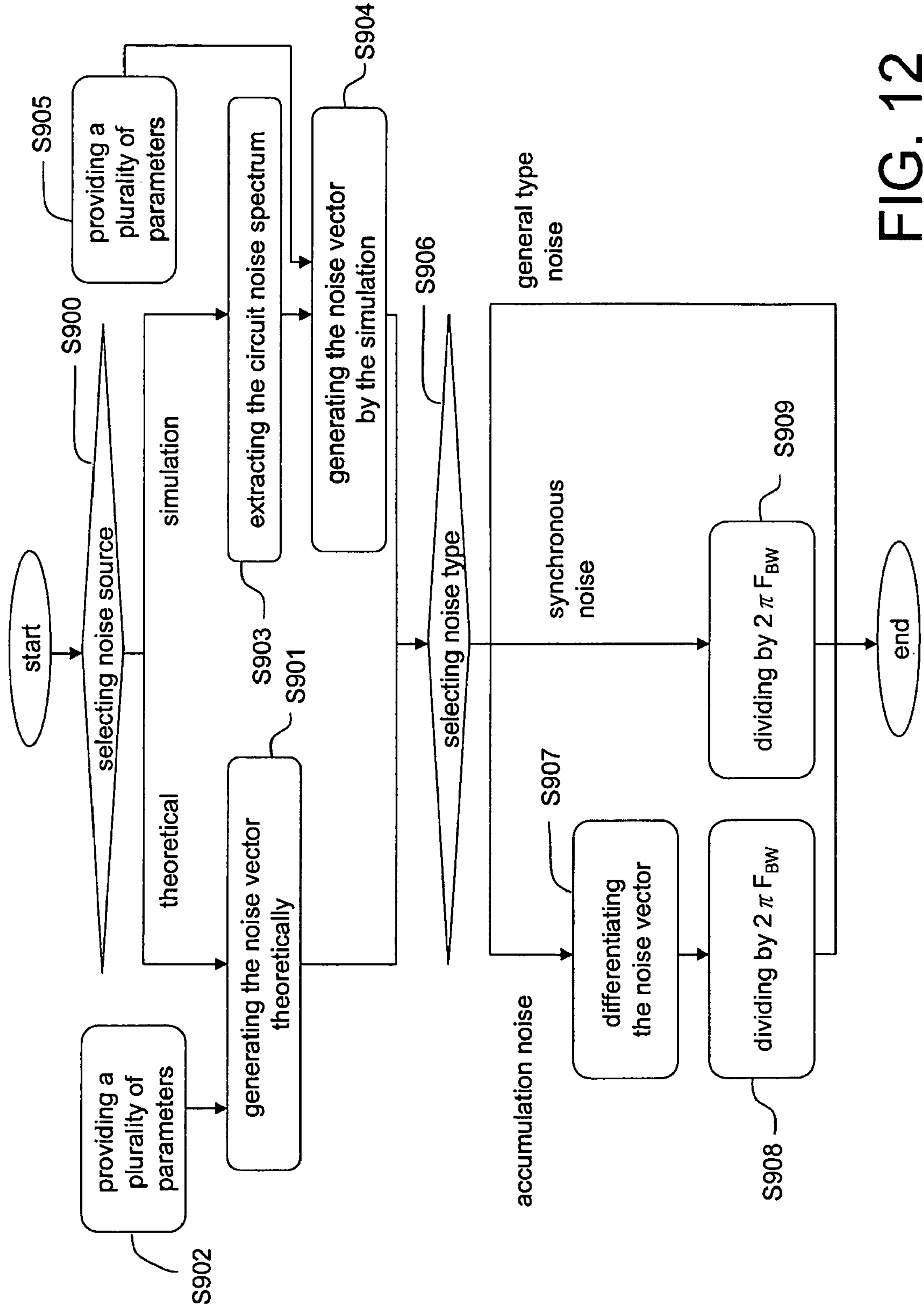
FIG. 12 is a flow chart of a method for generating the predefined noise vector of each simulation block according to the embodiment of the present invention.

Referring to FIG. 12, FIG. 12 is a flow chart of a method for generating the predefined noise vector of each simulation block according to the embodiment of the present invention. In step S900, the noise source of a particular predefined noise vector with arbitrary noise slopes generated by a theoretical script or a simulation (such as the transistor level circuit simulation) is selected. If the noise source generated by the script is selected, step S901 will be executed; by contrast, if the noise source generated by the simulation is selected, steps S903 and S904 will be executed.

In step S902, a plurality of the parameters is provided, such as the point size of the FFT (or IFFT), $N_{FFT}$, the noise frequency bandwidth of interest, $F_{BW}$, the type of slopes, the offset frequency, $F_m$, the phase noise level at $F_m$, and the corner frequency $F_c$. The noise frequency bandwidth of interest, $F_{BW}$, is the frequency ratio of which the simulation blocks use for updating the predefined noise vectors thereof. The lengths of the predefined noise vectors which are governed by the point size of the FFT (IFFT), $N_{FFT}$, which is the power of 2. The corner frequency $F_c$ is the point which the above slopes are crossing. The type of slopes will set two slope combinations of 0 dB/decade, ±10 dB/decade, ±20 dB/decade, ±30 dB/decade, and so on. In step S901, a noise vector in time domain is generated theoretically. The detail of step S901 will be described latter in FIG. 13.

In step S905, a plurality of the parameters is provided, such as the point size of the FFT (or IFFT), $N_{FFT}$, and the noise frequency bandwidth of interest, $F_{BW}$. It is noted that whether the noise source is generated by the theoretical script or the simulation, the two parameters, the FFT (or IFFT), $N_{FFT}$, and the noise frequency bandwidth of interest, $F_{BW}$, are required. In step S903, a circuit noise spectrum is extracted from the simulation or by other method. Then in step S904, the noise vector is generated by the simulation. The detail of step S904 will be described latter in FIG. 15.

It is noted that the voltage or current-controlled oscillator will have $N_{FFT}$ of points injected at frequency rate of $F_{VCO}$ or $F_{ICO}$ (frequency rate of the voltage or current-controlled oscillator), and the crystal oscillator will have $N_{FFT}/2^{ceil(log\ 2(N))}$ points injected at frequency rate of $F_{XO}$ (frequency rate of the crystal oscillator). Wherein, N is a positive integer. The entire vector of $N_{FFT}/2^{ceil(log\ 2(N))}$ number of points might not all be used in a simulation if N is an odd number for integer PLLs or a fractional number for fractional PLLs. The slightly diminished noise spectrum resolution due to the truncation is generally negligible since $N_{FFT}$ is often chosen to be about $2^{16}$. As will be described later on, $N_{FFT}$ and $F_{BW}$ will determine the lower offset frequency in the phase noise plot $F_{BW}/N_{FFT}$ and the highest offset frequency $F_{BW}/2$, where the latter is set by Nyquist stability criterion. As described above, the predefined noise vectors of the simulation block might be of different lengths depending on the frequency update rate thereof.

When the theoretical or simulated noise vector in time domain has been generated, the type of the noise vector must be selected. In step S906, the type of the noise vector is selected. If the type of the noise vector selected as the accumulation noise, steps S907 and S908 are executed; if the type of the noise vector selected as the synchronous noise, step S909 is executed; and if the type of the noise vector selected as the general type noise, the noise vector is set as the predefined noise vector without any processing.

In step S907, the noise vector is differentiated, $x_k=x_k-x_{k-1}$, wherein the current noise vector is represented as $x_k$, and the previous noise vector is represented as $x_{k-1}$. In step S908, the noise vector after being differentiated is divided by $2\pi F_{BW}$, and thus the divided noise vector is denormalized and saved as the predefined noise vector. Accordingly, the predefined noise vector is type of the accumulation noise which is introduced in the voltage or current-controlled oscillator. Due to the differential operator for accumulation noise, the initial noise vector length is set to $2+2^x$, which results in a length of $1+2^x$ after differentiation, wherein x is an integer number. The loss in resolution by not using the last element of the vector is negligible since the length of the noise vector is usually large enough.

In step S909, the noise vector is divided by $2\pi F_{BW}$, and then the divided noise is saved as the predefined noise vector. Accordingly, the predefined noise vector is type of the synchronous noise which is introduced in the crystal oscillator or the frequency divider. The general noise type is unmodified and saved as a predefined noise vector. The general noise type describes the thermal noise of the low pass filter, the voltage to current circuit, and PFD/CP block for instance.

Figure 13A:
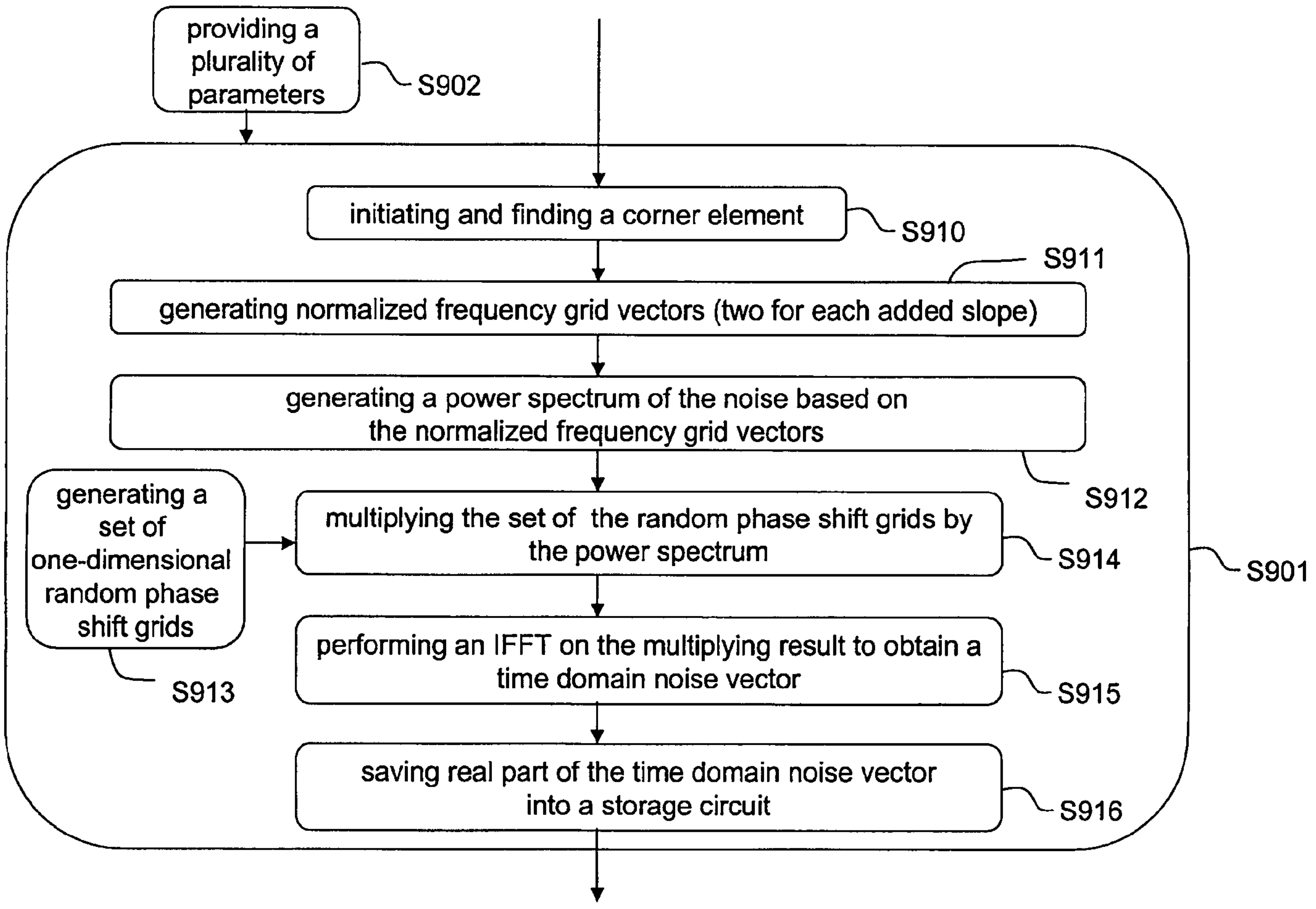
FIG. 13A is a flow chart of step S901 for generating the noise vector theoretically.

Referring to FIG. 13A, FIG. 13A is a flow chart of step S901 for generating the noise vector theoretically. The theoretical noise vector in time domain is generated with arbitrary frequency spectrum slopes. The following implementation of step S901 describes the manufacturing steps to build noise spectrum with 2 arbitrary slopes, but the invention does not limit how many slopes that can be created in this fashion. The parameters provided by step S902, such as the point size of the FFT (or IFFT), $N_{FFT}$, the noise frequency bandwidth of interest, $F_{BW}$, the type of slopes (including a first slope, $s_1$, and a second slope, $s_2$), the offset frequency, $F_m$, the phase noise level at $F_m$, $P_n$, and the corner frequency $F_c$ are used in step S901. The first and second slopes $s_1$ and $s_2$ are integer numbers where 0 corresponds to white noise or 0 dB/decade, −1 equals flicker noise or −10 dB/decade, −2 equals oscillator transformed white noise or −20 dB/decade, −3 equals oscillator transformed flicker noise or −30 dB/decade, and so on.

Referring to FIGS. 13A and 13B, FIG. 13B is a code table of the code executed in MATLAB® for implementing step S901. In step S910, the corner element is initiated and found depending on the FFT point size $N_{FFT}$, and the frequency rate $F_{BW}$ and corner frequency $F_c$. The implementation of step S910 is to execute the code block Code_110 of FIG. 13B. In step S911, normalized frequency grid vectors are generated, wherein each two normalized frequency grid vector are used for one added slope. Each of the frequency grid vectors is created by resembling a sawtooth curve with a first positive part and a second mirrored negative part, which describe the positive and negative frequencies. Each part must be broken into subparts if more than one slope is chosen, and one subpart per slope. Therefore, four frequency grid vectors are generated for the two slopes. The implementation of step S911 is shown in the relevant code block Code_111.

In step S912, a power spectrum of the noise is generated based on the normalized frequency grid vectors. The power spectrum is generated by two sub-steps. First, the power spectrum is denormalized to the corner frequency $F_c$, and subsequently the power spectrum is denormalized to the desired offset frequency $F_m$. The relevant implementation of step S912 is shown the code block Code_112. In step S912, a normalized power spectrum of the noise is generated based on the normalized frequency grid vectors. To put it concretely, the normalized power spectrum of the noise is generated by two sub-steps. First the spectrum is denormalizes to the corner frequency $F_c$, and subsequently denormalizes the spectrum to the desired offset frequency $F_m$.

In step S913, a set of one-dimensional random phase shift grids is generated, and the phases of the random phase shifts distribute in the uniform distribution between 0 and $N_{FFT}$. In step S914, the set of the random phase shift grids is multiplied by the power spectrum generated in step S912, and then in step S915, an IFFT is performed on the multiplying result to obtain a time domain noise vector. The implantation of steps S913-S915 is shown in the code block Code_113. In step S916, the real part of the time domain noise vector is saved as a file into a storage circuit, and the implantation of step S916 is shown in the code block Code_114.

Figure 14:
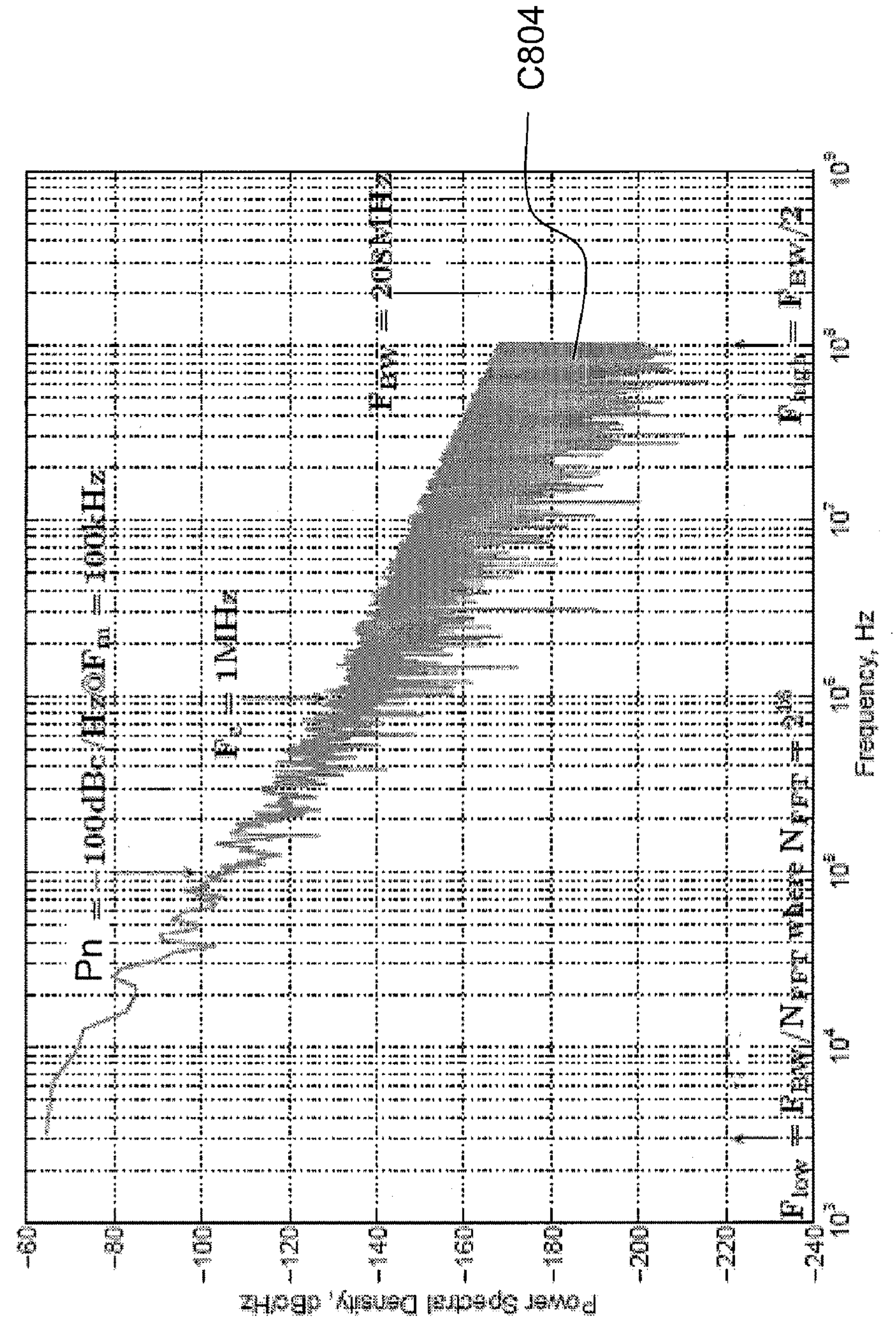
FIG. 14 is a curve diagram of the power spectrum density of the noise vector generated theoretically according to step S901.

Referring to FIG. 14, FIG. 14 is a curve diagram of the power spectrum density of the noise vector generated theoretically according to step S901. The FFT is performed on the noise vector generated theoretically according to step S901 to obtain and plot the power spectrum density of the noise vector. The x-axis shows the frequency in Hz, and the y-axis shows the power density spectrum in dBc/H. The curve C804 is the noise whose slopes include a flicker noise and a white noise. The frequency rate of the noise vector is set to $F_{BW}$=208 MHz, the corner frequency is set to $F_c$=1 MHz, and the phase noise level is set to $P_n$=−100 dBc/Hz at offset frequency $F_m$=100 kHz. Due to Nyquist stability criterion only frequencies up to $F_{high}=F_{BW}/2$ can be observed, whereas the lowest frequency is set by $F_{low}=F_{BW}/N_{FFT}$, wherein $N_{FFT}=2^{16}$.

Figure 15A:
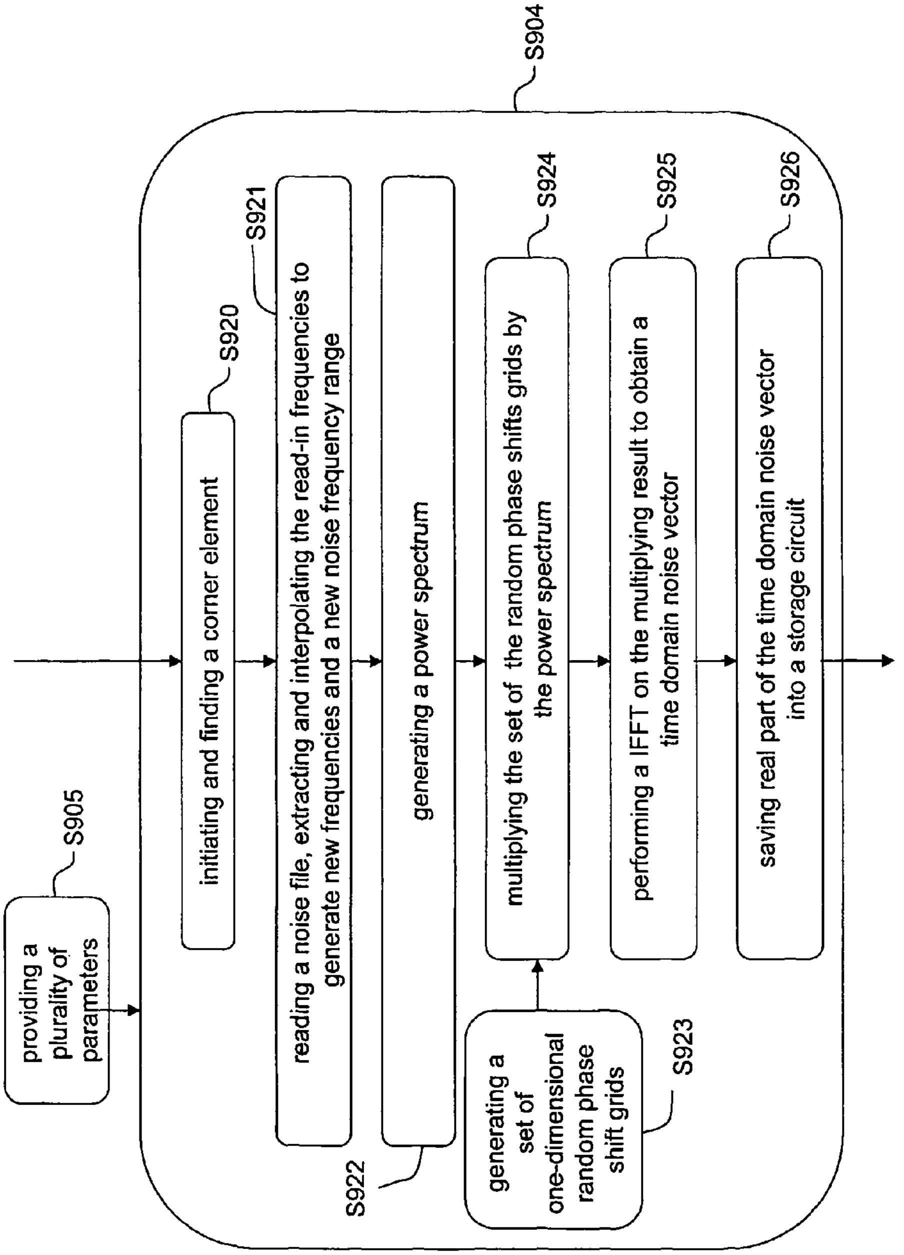
FIG. 15A is a flow chart of step S904 for generating the noise vector by the simulation.

Referring to FIG. 15A, FIG. 15A is a flow chart of step S904 for generating the noise vector by the simulation. The following implementation of step S904 describes the manufacturing steps to build a predefined noise vector in time domain from a noise or phase noise spectrum simulation by a tool such as Spectre-RF or Eldo-RF. The file to be post-processed containing the noise data has a frequency column in Hertz and logarithmic domain and a second column with the noise data in dBc/Hz. The parameters provided by step S905, such as the point size of the FFT (or IFFT), $N_{FFT}$, and the noise frequency bandwidth of interest, $F_{BW}$, are used in step S904.

Referring to FIGS. 15B and 15B, FIG. 15B is a code table of the code executed in MATLAB® for implementing step S904. In step S920, the corner element is initiated and found depending on the FFT point size $N_{FFT}$, and the frequency rate $F_{BW}$. The implementation of step S920 is to execute the code block Code_120 of FIG. 15B. Thus cornerstones of the vectors are calculated, and the information of the corner element is hidden in the cornerstones.

In step S921, a noise file is read, and then the new frequencies and the new noise frequency range are generated by extracting and interpolating the read-in frequencies relative to the FFT point size $N_{FFT}$ and the frequency rate $F_{BW}$. The read-in frequencies are in a form of the logarithmic frequencies, and the new frequencies are in a form of the linear frequencies. The implementation of step S921 is shown in the relevant code block Code_121. In step S922, the new frequencies obtained in step S921 are used to calculate the power spectrum, and the implementation of step S922 is shown in the relevant code block Code_122.

In step S923, a set of one-dimensional random phase shift grids is generated, and the phases of the random phase shifts distribute in the uniform distribution between 0 and $N_{FFT}$. In step S924, the set of the random phase shift grids is multiplied by the power spectrum generated in step S922, and then in step S925, an IFFT is performed on the multiplying result to obtain a time domain noise vector. The implantation of steps S912-S925 is shown in the code block Code_123. In step S926, the real part of the time domain noise vector is saved as a file into a storage circuit, and the implantation of step S926 is shown in the code block Code_124.

Figure 16:
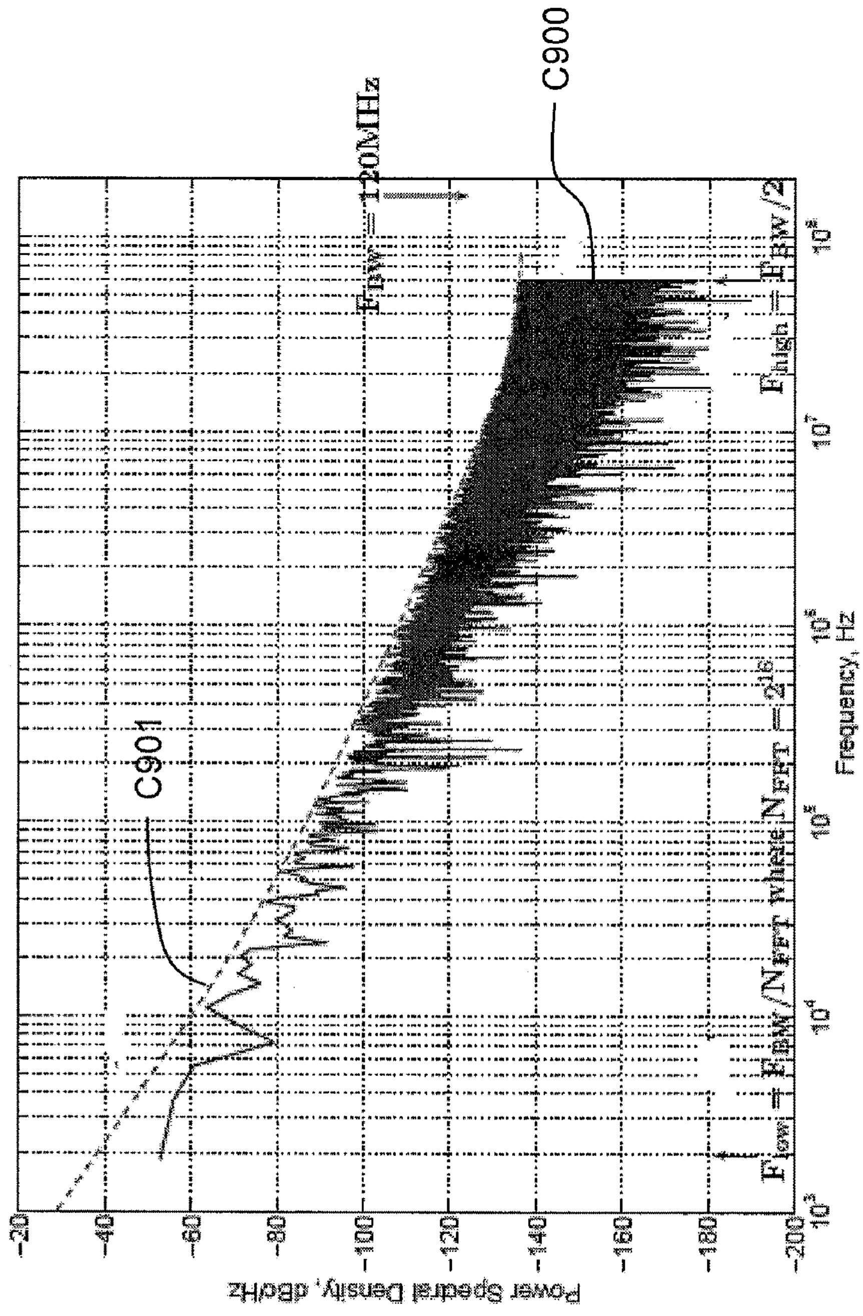
FIG. 16 is a curve diagram of the power spectrum density of the noise vector generated by the simulation according to step S904.

FIG. 16 is a curve diagram of the power spectrum density of the noise vector generated by the simulation according to step S904. The FFT is performed on the noise vector generated theoretically according to step S904 to obtain and plot the power spectrum density of the noise vector. The x-axis shows the frequency in Hz, and the y-axis shows the power density spectrum in dBc/H. The curve C900 is the predefined noise vector curve of transistor level simulated noise. The curve C901 is the simulated phase noise curve after being post-processed by the function. The frequency rate of the noise vector is set to $F_{BW}$=208 MHz, the corner frequency is set to $F_c$=1 MHz, and the phase noise level is set to $P_N$=−1000 dBc/Hz at offset frequency $F_m$=100 kHz. Due to Nyquist stability criterion only frequencies up to $F_{high}=F_{BW}/2$ can be observed, whereas the lowest frequency is set by $F_{low}=F_{BW}/N_{FFT}$, wherein $N_{FFT}=2^{16}$.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A method for generating phase noise in a system with a phase-locked loop (PLL) while the system is simulated in time domain, comprising:

modelling a simulator with a processor of a computer, wherein the simulator comprises simulation blocks, the simulation blocks correspond to blocks of the system, each of the simulation blocks has a predefined phase vector whose elements are injected consecutively at a trigger event; and classifying, with the processor, the simulation blocks, wherein each of the simulation blocks is classified as a master element block, a semi-master element block, or a slave element block, the simulation blocks having exactly one master element block;

wherein an element selection of each predefined noise vector is steered from the master element block, the semi-master element block is self-triggered and determines its own injection frequency rate, and is reset-steered and aligned with the master element block as a capturing data phase starts, and the slave element block is directly steered with the master element block, wherein the blocks of the system with the PLL comprise the PLL, a frequency divider, and a crystal oscillator, wherein, the PLL comprises a phase-frequency detection and charge pump circuit (PFD/CP) block, and a low pass filter, and a controlled oscillator, the simulation block corresponding to the controlled oscillator is the master element block, the simulation blocks corresponding to the crystal oscillator, the frequency divider, and the PFD/CP block are the semi-master element blocks, and the simulation block corresponding to the low pass filter is the slave element block.

2. The method according to claim 1, further comprising:

obtaining bias points of all blocks in the system;

separately simulating each block at the bias point thereof;

extracting information from simulation results of the blocks, wherein the information comprises noise frequency spectrums, transfer functions, time delays, nonlinearities of all blocks;

post-processing the noise frequency spectrums to the predefined noise vectors; and post-processing the transfer functions to behavior function modules of the simulation blocks.

3. The method according to claim 2, wherein the bias points of all blocks in system are obtained by performing a transistor level transient analysis of the entire system with the PLL, or by simulating a frequency behavior of an oscillator of the PLL and back calculating the biasing points of the other blocks of system, or the bias points of all blocks in system are known beforehand.

4. The method according to claim 1, further comprising:

post-processing simulated output vectors of the system; and plotting the phase noise of the system based on the simulated output vectors.

5. The method according to claim 1, each predefined noise vector is generated theoretically or by a transistor level circuit simulation.

6. The method according to claim 5, the steps for generating each predefined noise vector theoretically comprises:

initiating and finding a corner element based on a PLL output frequency and a fast Fourier transformation (FFT) point size;

generating normalized frequency grid vectors based on the corner element, wherein each two frequency grid vectors correspond to one slope of noise in a power spectrum;

generating the power spectrum of the noise based on the normalized frequency grid vectors;

generating a set of one-dimensional random phase shift grids, and multiplying the set of the random phase shift grids by the power spectrum of the noise;

performing an inverse fast Fourier transformation (IFFT) on a multiply result to obtain a time domain noise vector, and saving the real part of the time domain noise vector; and post-processing the time domain noise vector to generate the predefined noise vector.

7. The method according to claim 5, the steps for generating each predefined noise vector by the transistor level circuit simulation comprises:

initiating and finding a corner element based on a PLL output frequency and a fast Fourier transformation (FFT) point size;

reading a noise file, and extracting and interpolating read-in frequencies to generate new frequencies and a new noise frequency range;

generating a power spectrum of noise based on the new frequencies;

generating a set of one-dimensional random phase shift grids, and multiplying the set of the random phase shift grids by the power spectrum of the noise;

performing an inverse fast Fourier transformation (IFFT) on a multiply result to obtain a time domain noise vector, and saving the real part of the time domain noise vector; and post-processing the time domain noise vector to generate the predefined noise vector.

8. The method according to claim 1, the type of each predefined noise vector is classified as an accumulation noise, a synchronous noise, and a general type noise.

9. A simulator for generating phase noise in a system with a phase-locked loop (PLL) while the system is simulated in time domain, comprising:

a processor of a computer for executing simulations in the simulator; and a master element block, at least one slave element block, and semi-master element blocks, each of them has its own predefined noise vectors whose elements are injected consecutively at a trigger event;

wherein an element selection of each predefined noise vector is steered from the master element block, the semi-master element blocks are self-triggered and determines their own injection frequency rate, and are reset-steered and aligned with the master element block as a capturing data phase starts, and the slave element block is directly steered with the master element block, wherein the system with the PLL comprises the PLL, a frequency divider, and a crystal oscillator, wherein, the PLL comprises a phase-frequency detection and charge pump circuit (PFD/CP) block, and a low pass filter, and a controlled oscillator, the master element block is corresponding to the controlled oscillator, the semi-master element blocks are corresponding to the crystal oscillator, the frequency divider, and the (PFD/CP) block, and the slave element block is corresponding to the low pass filter.

10. The simulator according to claim 9, wherein the master element block comprises:

a behavior function module, a behavior function thereof corresponds to a block in the system, the behavior function module receives an input signal and an element selected from the predefined noise vector thereof, and outputs a module signal in response to the input signal, and an output signal in response to the behavior function thereof, the element selected from the predefined noise vector thereof, and the input signal;

a trigger signal generating circuit, for receiving the module signal and outputting a trigger signal;

a counter, for counting an element select signal from an initial value, and increasing the element select signal by one when the trigger signal triggers it, wherein a reset terminal of the counter is floated; and a predefined noise vector generator, for generating the predefined noise vector thereof, and outputting the element selected from the predefined noise vector thereof according to the element select signal;

wherein the element select signal is used to steer the element selection of the other predefined noise vectors.

11. The simulator according to claim 10, wherein the master element block further comprises:

a stop circuit, for stopping the behavior function module when the element select signal is equal to a number of $2^x$, wherein x is an integer;

a writing control circuit, for controlling a measure circuit and a storage circuit according to the element select signal;

the measure circuit, for measuring a time period of the output signal generated in the capturing data phase; and the storage circuit, for writing the time period and the output signal in the capturing data phase.

12. The simulator according to claim 10, wherein the initial value is a negative integer, and the master element block discards the output signal before the master element block enters into the capturing data phase.

13. The simulator according to claim 9, wherein each of the semi-master element blocks comprises:

a behavior function module, a behavior function thereof corresponds to a block in the system, the behavior function module receives an input signal and an element selected from the predefined noise vector thereof, and outputs a module signal in response to the input signal, and an output signal in response to the behavior function thereof, the element selected from the predefined noise vector thereof, and the input signal;

a trigger signal generating circuit, for receiving the module signal and outputting a trigger signal;

a counter, for counting an element select signal from an initial value, and increasing the element select signal by one when the trigger signal triggers it, wherein the counter is reset-steered and aligned with the master element block as the capturing data phase starts; and a predefined noise vector generator, for generating the predefined noise vector thereof, and outputting the element selected from the predefined noise vector thereof according to the element select signal.

14. The simulator according to claim 9, wherein the slave element block comprises:

a behavior function module, a behavior function thereof corresponds to a block in the system, the behavior function module receives an input signal and an element selected from the predefined noise vector thereof, and outputs a module signal in response to the input signal, and an output signal in response to the behavior function thereof, the element selected from the predefined noise vector thereof, and the input signal; and a predefined noise vector generator, for generating the predefined noise vector thereof, and outputting the element selected from the predefined noise vector, wherein the element selection of the predefined noise vector is steered and aligned with the master element block as the capturing data phase starts.

15. The simulator according to claim 9, each predefined noise vector is generated theoretically or by a transistor level circuit simulation.

16. The simulator according to claim 9, the type of each predefined noise vector is classified as an accumulation noise, a synchronous noise, and a general type noise.

* * * * *